United States Patent
Bradshaw (12)

(10) Patent No.: US 10,778,565 B2
(45) Date of Patent: Sep. 15, 2020

(54) FORWARDING CURRENT REQUEST BASED ON, AT LEAST IN PART, PREVIOUS REQUEST(S)

(71) Applicant: Microsoft Technology Licensing, LLC, Redmond, WA (US)

(72) Inventor: Gareth R. Bradshaw, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 148 days.

(21) Appl. No.: 15/971,034

(22) Filed: May 4, 2018

(65) Prior Publication Data

US 2018/0254973 A1 Sep. 6, 2018

Related U.S. Application Data

(62) Division of application No. 14/720,434, filed on May 22, 2015, now Pat. No. 10,015,077.

(51) Int. Cl.
*H04L 12/751* (2013.01)
*H04L 12/727* (2013.01)
(Continued)

(52) U.S. Cl.
CPC ............ *H04L 45/08* (2013.01); *H04L 45/121* (2013.01); *H04L 45/122* (2013.01); *H04L 45/22* (2013.01);
(Continued)

(58) Field of Classification Search
None
See application file for complete search history.

(56) References Cited

U.S. PATENT DOCUMENTS 6,304,913 B1 * 10/2001 Rune ................. H04L 29/12066
709/241
6,754,699 B2   6/2004 Swildens et al.
(Continued)

FOREIGN PATENT DOCUMENTS

CN      102594672 A     7/2012
CN      104581219 A     4/2015
(Continued)

OTHER PUBLICATIONS

Shaikh, et al., "On thE Effecctiveness of DNS-based Server Selection", In Proceedings of Twentieth Annual Joint Confrence of the IEEE Computer and Communications Societies, Apr. 22, 2001, 10 pages.
(Continued)

*Primary Examiner* — James A Edwards
(74) *Attorney, Agent, or Firm* — Ray Quinney & Nebeker P.C; James Bullough

(57) ABSTRACT

A plurality of forwarding servers is communicatively coupled to a plurality of sending systems via a network. A first forwarding server associated with a first geographical region includes an interface that receives a first request for a resource from a first sending system via the network. A determination logic determines whether one or more requests that precede the first request are received from the first sending system at a second forwarding server associated with a second geographical region. A causation logic causes the first request to be forwarded to a second endpoint associated with the second geographical region rather than a first endpoint associated with the first geographical region at least partly based on an inference that the first sending system is located in the second geographical region.

19 Claims, 7 Drawing Sheets

(51) Int. Cl.
*H04L 12/733* (2013.01)
*H04L 12/707* (2013.01)

(52) U.S. Cl.
CPC ..... *H04L 45/02* (2013.01); *H04M 2203/2094* (2013.01)

(56) References Cited

U.S. PATENT DOCUMENTS

| | | | |
|---|---|---|---|
| 6,901,445 B2 | 5/2005 | McCanne et al. | |
| 6,973,620 B2 | 12/2005 | Gusler et al. | |
| 7,725,602 B2 | 5/2010 | Liu et al. | |
| 7,734,730 B2 | 6/2010 | McCanne | |
| 7,876,712 B2 | 1/2011 | Decasper et al. | |
| 7,904,541 B2 | 3/2011 | Swildens et al. | |
| 8,073,953 B2 | 12/2011 | Christian et al. | |
| 8,244,874 B1 | 8/2012 | Thireault | |
| 8,392,611 B2 | 3/2013 | Leighton et al. | |
| 8,423,666 B2 | 4/2013 | Garcia-Luna-Aceves et al. | |
| 8,468,247 B1* | 6/2013 | Richardson | H04L 67/18 709/226 |
| 8,560,598 B2 | 10/2013 | Santoro et al. | |
| 8,607,014 B2 | 12/2013 | Spatscheck et al. | |
| 8,626,950 B1* | 1/2014 | MacCarthaigh | H04L 61/1511 709/223 |
| 10,015,077 B2 | 7/2018 | Bradshaw | |
| 2003/0043179 A1 | 3/2003 | Gusler et al. | |
| 2009/0304007 A1 | 12/2009 | Tanaka et al. | |
| 2009/0327489 A1* | 12/2009 | Swildens | G06F 9/505 709/224 |
| 2010/0121945 A1 | 5/2010 | Gerber et al. | |
| 2010/0223364 A1* | 9/2010 | Wei | H04L 29/04 709/220 |
| 2011/0280247 A1 | 11/2011 | Roskind | |
| 2013/0091241 A1 | 4/2013 | Goetz et al. | |
| 2013/0124465 A1 | 5/2013 | Pingel et al. | |
| 2013/0297596 A1* | 11/2013 | Mouline | H04L 67/1008 707/724 |
| 2014/0237067 A1 | 8/2014 | Todd | |
| 2015/0081926 A1* | 3/2015 | White | H04L 67/1008 709/245 |
| 2015/0341428 A1 | 11/2015 | Chauhan | |

FOREIGN PATENT DOCUMENTS

| | | |
|---|---|---|
| EP | 2772041 A1 | 9/2014 |
| WO | 0010084 A2 | 2/2000 |

OTHER PUBLICATIONS

U.S. Appl. No. 14/339,097, Flavel, et al., "Partitioned Caching of Dynamic DNS Response for Traffic Management", filed Jul. 23, 2014, 36 pages.

"Traffic Manager", Retrieved on: Apr. 2, 2015, 2 pages, Available at: http://azure.microsoft.com/en-us/services/traffice-manager/.

"Traffic Manager Overview", Retrieved on: Apr. 2, 2015, 7 pages, Available at: https://msdn.microsoft.com/en-us/library/azure/hh744833.aspx.

"International Search Report and Written Opinion Issued in PCT Application No. PCT/US2016/033380", dated Jul. 11, 2016, 12 Pages.

"Final Office Action Issued in U.S. Appl. No. 14/720,434", dated Nov. 29, 2017, 18 Pages.

"Non Final Office Action Issued in U.S. Appl. No. 14/720,434", dated May 30, 2017, 18 Pages.

"Notice of Allowance issued in U.S. Appl. No. 14/720,434", dated Mar. 5, 2018, 23 pages.

"First Office Action and Search Report Issued in Chinese Patent Application No. 201680029500.5", dated Jan. 14, 2020, 14 Pages.

* cited by examiner

FORWARDING CURRENT REQUEST BASED ON, AT LEAST IN PART, PREVIOUS REQUEST(S)

CROSS-REFERENCE TO RELATED APPLICATIONS

The present application is a divisional of U.S. patent application Ser. No. 14/720,434 filed May 22, 2015. The entire disclosure of the application referenced above is incorporated by reference.

BACKGROUND

In networked systems, Traffic Management services are often used to route requests for resources to service instances (a.k.a. endpoints) that are believed to be near the machines that makes the requests, rather than having the requests traverse the network, in an effort to reduce latency associated with receiving such resources. One example type of a Traffic Management service is based on Domain Name System (DNS). DNS-based Traffic Management reduces latency by serving different DNS responses during the name resolution process that occurs when resources are requested. For instance, when a fully qualified domain name (FQDN) of a service or site is being resolved, a DNS server uses the source address of the machine that makes the request to send a response that references the available endpoint that is believed to be "closest" to the end user, where "closest" is usually defined in terms of network latency.

In conventional networked systems, pings are often used to determine the availability and locations (in terms of latency) of the various endpoints in the networked system. Each ping provides a measure of the round-trip time for a message (e.g., an Internet Control Message Protocol (ICMP) echo request) to be sent to an endpoint and to be received back at the machine that sent the message. These round-trip times may be used to construct a map of the locations of the endpoints. However, this mapping process typically is costly (e.g., requiring latency measurements from millions of locations around the globe), error-prone (e.g., local anomalies in observed latency may be difficult to eliminate), incomplete (e.g., some source addresses may not be measureable), short-lived (e.g., the mapping may change during the time taken to construct the map), and becomes increasingly difficult to obtain and manage as the source address space grows (e.g. IPv6).

Another approach is to utilize a set of geographically diverse "anycast" DNS servers. Using anycast causes each DNS request to be routed to a nearby DNS server that knows its location and assumes that the end user is nearer to it than to each other DNS server. However, the resulting Traffic Management may be compromised if too few DNS server locations are available and/or if a site goes down or becomes unavailable due to connectivity problems. If a site goes down or becomes unavailable, the DNS requests may be handled by other servers, each of which may assume that the end user is "closest" to that server and therefore serve a sub-optimal response.

SUMMARY

Various approaches are described herein for, among other things, forwarding a current request based on, at least in part, previous request(s).

In a first example approach, a networked system includes forwarding servers that are communicatively coupled to sending systems via a network. The forwarding servers include at least a first forwarding server and a second forwarding server. A current request is received at the first forwarding server from a specified sending system via the network. The current request requests access to a resource. A determination is made that the second forwarding server causes previous request(s) from the specified sending system to be forwarded to a specified endpoint. The previous request(s) precede the current request. The current request is caused to be forwarded to the specified endpoint based on, at least in part, a determination that the second forwarding server causes the previous request(s) to be forwarded to the specified endpoint.

In a second example approach, a networked system includes forwarding servers that are communicatively coupled to sending systems via a network. The forwarding servers include at least a first forwarding server and a second forwarding server. A current request for a resource is received at the first forwarding server from a specified sending system via the network. The first forwarding server is associated with a first geographical region. A determination is made that previous request(s) that precede the current request are received at the second forwarding server from the specified sending system. The second forwarding server is associated with a second geographical region. An inference is made that a location of the specified sending system is in the second geographical region based on, at least in part, a determination that the previous request(s) are received at the second forwarding server. The current request is caused to be forwarded to a second endpoint that is associated with the second geographical region rather than a first endpoint that is associated with the first geographical region based on, at least in part, the inference that the location of the specified sending system is in the second geographical region.

In a third example approach, a networked system includes forwarding servers that are communicatively coupled to sending systems via a network. The forwarding servers include at least a first forwarding server and a second forwarding server. A current request is received at the first forwarding server from a specified sending system via the network. The current request requests access to a resource. A determination is made that the second forwarding server responds to previous request(s) from the specified sending system. The previous request(s) precede the current request. The current request is caused to be forwarded to a second endpoint that is a second network distance from the second forwarding server rather than a first endpoint that is a first network distance from the second forwarding server based on, at least in part, determining that the second forwarding server responds to the previous request(s) from the specified sending system. The second network distance is less than the first network distance. The second endpoint is a third network distance from the first forwarding server. The first endpoint is a fourth network distance from the first forwarding server. The fourth network distance is less than the third network distance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example forwarding system in accordance with an embodiment.

FIGS. 2, 3, and 5 depict flowcharts of example methods for forwarding current requests based on, at least in part, previous requests in accordance with embodiments.

Figure 1:
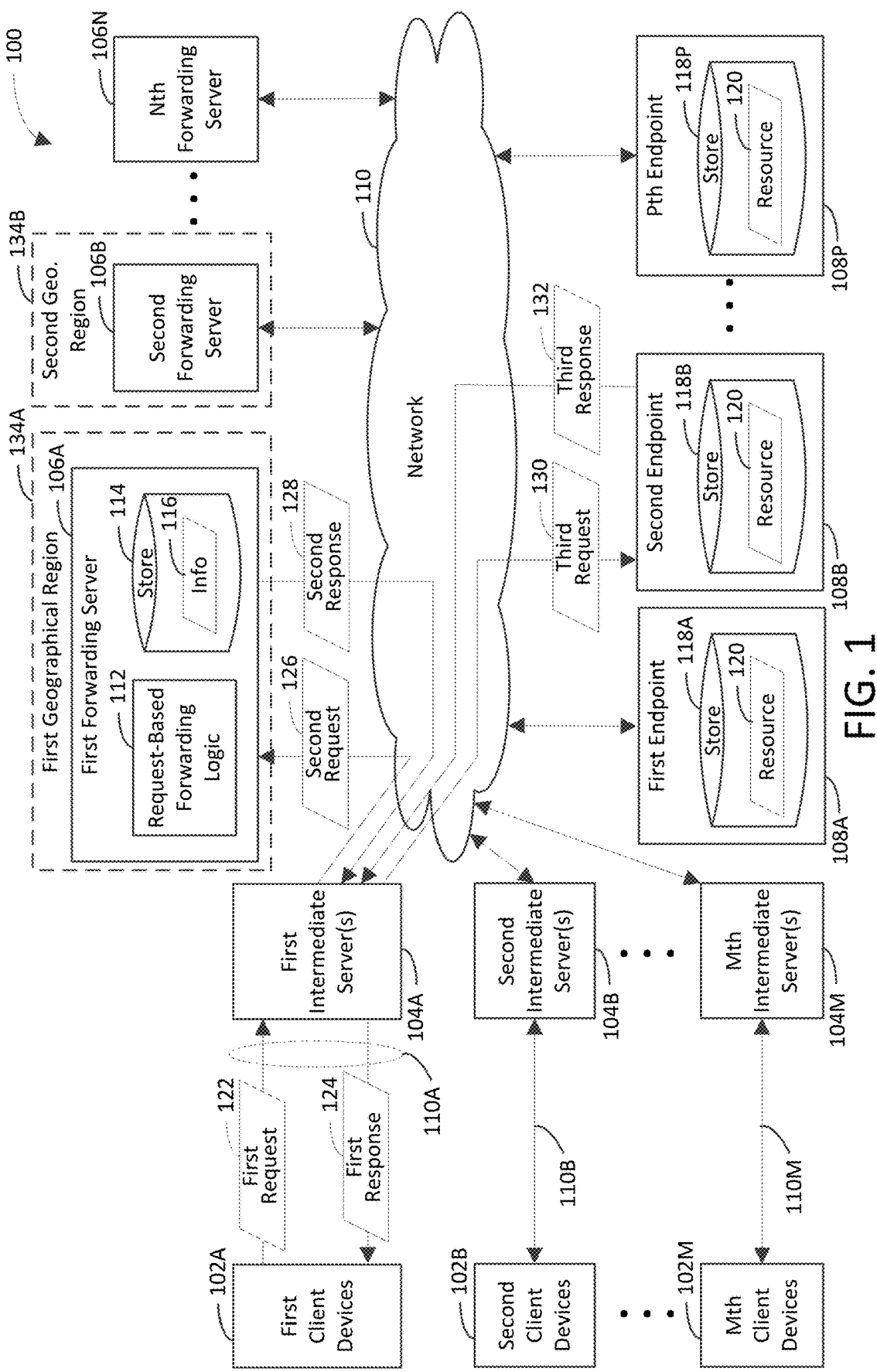

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of forwarding a current request based on, at least in part, previous request(s). For instance, the current request may be received at a first forwarding server from a sending server via a network. The first forwarding server may determine that a second forwarding server is associated with (e.g., receives, causes to be forwarded, or responds to) previous request(s) from the sending system. The first forwarding server may cause the current request to be forwarded to an endpoint based on, at least in part, the previous request(s) being associated with the second forwarding server. For instance, the first forwarding server may cause the current request to be forwarded to the endpoint based on, at least in part, the second forwarding server forwarding the previous request(s) to the endpoint.

Example techniques described herein have a variety of benefits as compared to conventional techniques for forwarding requests. For instance, the example techniques may be capable of determining a most performant endpoint (e.g., the endpoint having the least latency) to which a request is to be forwarded, even though other endpoint(s) may be closer (e.g., in terms of latency) to the forwarding server. The example techniques may obviate a need for a ping-based latency mapping system. The example techniques may reduce a cost of forwarding requests, as compared to conventional techniques. For instance, the example techniques may not rely on measurements regarding all endpoints in the networked system. The example techniques may reduce a number of errors associated with latency determinations.

The example techniques may be capable of determining to which endpoint a request is to be forwarded even if source addresses of sending systems are not available (e.g., not measurable). The example techniques may be less negatively affected (e.g., unaffected) by increases in the size of the address space and/or changes of latency with regard to endpoints in the networked system, as compared to conventional techniques. The example techniques may be less negatively affected (e.g., unaffected) by a number of sending systems being relatively few, by a site going down, and/or by a site becoming unavailable (e.g., due to a connectivity problem). For instance, the example techniques may enable a forwarding server that receives a request to infer (or may inform the forwarding server) that the forwarding server is not the closest forwarding server to the sending system that sent the request and/or that another forwarding server is the closest forwarding server to the sending system. The example techniques may reduce an amount of time and/or resources (e.g., processor cycles and/or memory) that are consumed to determine to which endpoint a request is to be forwarded.

FIG. 1 is a block diagram of an example forwarding system 100 in accordance with an embodiment. Generally speaking, forwarding system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, forwarding system 100 forwards a current request based on, at least in part, previous request(s). Detail regarding techniques for forwarding a current request based on, at least in part, previous request(s) is provided in the following discussion.

As shown in FIG. 1, forwarding system 100 includes pluralities of client devices 102A-102M, a plurality of intermediate servers 104A-104M, a plurality of forwarding servers 106A-106N, a plurality of endpoints 108A-108P, and a network 110. Communication among client devices 102A-102M, intermediate servers 104A-104M, forwarding servers 106A-106N, and endpoints 108A-108P is carried out over network 110 using well-known network communication protocols. Network 110 may be a wide-area network (e.g., the Internet), a local area network (LAN), another type of network, or a combination thereof.

Client devices 102A-102M are processing systems that are capable of communicating with endpoints 108A-108P. For instance, client devices 102A-102M may communicate with endpoints 108A-108P through one or more other systems, such as intermediate servers 104A-104M and/or forwarding servers 106A-106N. An example of a processing system is a system that includes at least one processor that is capable of manipulating data in accordance with a set of instructions. For instance, a processing system may be a computer, a personal digital assistant, etc. Client devices 102A-102M are configured to provide requests for requesting information (e.g., data and/or services) stored on (or otherwise accessible via) endpoints 108A-108P. For instance, a user may initiate a request for executing a computer program (e.g., an application) using a client (e.g., a Web browser, Web crawler, or other type of client) deployed on a client device 102 that is owned by or otherwise accessible to the user. In accordance with some example embodiments, client devices 102A-102M are capable of accessing domains (e.g., Web sites) hosted by endpoints 108A-108P, so that client devices 102A-102M may access resources that are available via the domains. Such domain may include Web pages, which may be provided as hypertext markup language (HTML) documents and objects (e.g., files) that are linked therein, for example.

Client devices 102A-102M may include any client-enabled system or device, including but not limited to a desktop computer, a laptop computer, a tablet computer, a personal digital assistant, a cellular telephone, a wearable device, or the like. It will be recognized that any one or more of the client devices 102A-102M may communicate with any one or more of the endpoints 108A-108P.

Endpoints 108A-108P are processing systems that are capable of communicating with client devices 102A-102M. For instance, endpoints 108A-108P may communicate with client devices 102A-102M through one or more other systems, such as intermediate servers 104A-104M and/or forwarding servers 106A-106N. Endpoints 108A-108P are configured to execute computer programs that provide information to users in response to receiving requests from the users. For example, the information may include documents (e.g., Web pages, images, audio files, video files, etc.), output of executables, or any other suitable type of information. In accordance with some example embodiments, endpoints 108A-108P are configured to host respective Web sites, so that the Web sites are accessible to users of forwarding system 100.

Endpoints 108A-108P include respective stores 118A-118P. Each of the stores 118A-118P stores a respective copy of a resource 120 or a reference thereto. The resource 120 may be a file, web content, database content, output of an executable, or any other suitable type of information. One or more attributes of the copies of the resource 120 may differ. For instance, the copy of the resource 120 stored in a first store 118A may correspond to a first language (e.g., Irish); the copy of the resource 120 stored in a second store 118B may correspond to a second language (e.g., English), and so on. Nevertheless, the substance of the resource 120 may be the same across the various copies. One type of store is a database. For instance, each of the stores 118A-118P may be a relational database, an entity-relationship database, an object database, an object relational database, an extensible markup language (XML) database, etc.

It will be recognized that the copies of the resource 120 need not necessarily be stored on stores 118A-118P. For example, one or more copies of the resource 120 may be stored on a centralized store. In another example, one or more copies of the resource 120 may not be stored in accordance with the conventional meaning of the term "store".

Intermediate servers 104A-104M are processing systems that are configured to send requests that are received from client devices 102A-102M via respective communication links 110A-110M to selected forwarding servers of the forwarding servers 106A-106N on behalf of the client devices 102A-102M. For instance, first intermediate server(s) 104A send each request that is received from a client device of the first client devices 102A via a first communication link 110A to a selected forwarding server of the forwarding servers 106A-106N on behalf of the client device from which the request is received. Second intermediate server(s) 104B send each request that is received from a client device of the second client devices 102B via a second communication link 110B to a selected forwarding server of the forwarding servers 106A-106N on behalf of the client device from which the request is received, and so on.

Intermediate servers 104A-104M may send the aforementioned requests to the forwarding servers that are "closest" (in terms of latency) to the respective intermediate servers 104A-104M and that are capable of forwarding the requests to an endpoint. For example, if a forwarding server that is closest to an intermediate server is incapable of forwarding a request, the intermediate server may send the request to the next closest forwarding server or to another forwarding server. A forwarding server may be incapable of forwarding a request for any of a variety of reasons, including but not limited to the forwarding server being inoperable, the forwarding server being offline (e.g., unavailable), an error occurring with regard to the forwarding server, etc.

Each of the intermediate servers 104A-104M may be a recursive resolver (e.g., a DNS recursive resolver) and/or a caching resolver (e.g., a DNS caching resolver), though the example embodiments are not limited in this respect. In one example implementation, any one or more of the intermediate servers 104A-104M may be configured to be a DNS server. For instance, any one or more of the intermediate servers 104A-104M may include a respective DNS client, which is software that is configured to generate DNS requests. In another example implementation, any one or more of the intermediate servers 104A-104M may be configured to be a HTTP server, which serves as a frontend proxy that redirects HTTP requests based on, at least in part, HTTP response codes (e.g., HTTP response code 307).

Each of the intermediate servers 104A-104M may correspond to a respective entity, such as an internet service provider (ISP) or other business organization, though the scope of the example embodiments is not limited in this respect. For example, a first ISP may own first intermediate server(s) 104A and/or serve as an intermediary for all resource requests that are provided by first client devices 102A. In another example, a relatively large corporation (e.g., Microsoft Corporation, Google Inc., or Yahoo Inc.) may own second intermediate server(s) 104B and/or serve as an intermediary for all resource requests that are provided by second client devices 102B. In yet another example, a second ISP may own Mth intermediate server(s) 104M and/or serve as an intermediary for all resource requests that are provided by Mth client devices 102M. These examples are provided for illustrative purposes and are not intended to be limiting. Each of the intermediate servers 104A-104M may correspond to any suitable entity.

It will be recognized that forwarding system 100 may not include the plurality of intermediate servers 104A-104M. For example, client devices 102A-102M may communicate with forwarding servers 106A-106N without going through any of the intermediate servers 104A-104M, and/or vice versa. In another example, client devices 102A-102M may communicate with endpoints 108A-108P without going through any of the intermediate servers 104A-104M, and/or vice versa.

Forwarding servers 106A-106N are processing systems that are configured to cause requests that are received directly or indirectly (e.g., via intermediate server(s)) from client devices 102A-102M to be forwarded to selected endpoints of the endpoints 108A-108P. For example, forwarding servers 106A-106N may forward the requests to the selected endpoints. In another example, forwarding servers 106A-106N may provide instructions to the sending systems (e.g., intermediate servers or client devices) that provided the requests, instructing the sending systems to forward the requests to the selected endpoints. Each sending system is a client device of the client devices 102A-102M or intermediate server(s) of the intermediate servers 104A-104M.

Forwarding servers 106A-106N may be associated with respective geographical regions, though the scope of the example embodiments is not limited in this respect. For instance, first forwarding server 106A and second forwarding server 106B are shown in FIG. 1 to be associated with a first geographical region 134A and a second geographical region 134B, respectively. It will be recognized that any one or more sending systems (e.g., any one or more of client devices 102A-102M and/or any one or more of intermediate servers 104A-104M) and/or any one or more of endpoints 108A-108P may be included in the first geographical region 134A, the second geographical region 134B, or another geographical region.

First forwarding server 106A is shown to include request-based forwarding logic 112 and a store 114 for illustrative purposes. Store 114 stores information 116. For example, the information 116 may indicate a location of each of the intermediate servers 104A-104M from which first forwarding server 106A has received a request for a resource. In accordance with this example, the information 116 may include an internet protocol (IP) address of each of the intermediate servers 104A-104M from which first forwarding server 106A has received a request for a resource. Store 114 may be any suitable type of store.

In one example implementation, the information 116 correlates selected previous request(s) with sending system(s) that send those previous request(s). For instance, the information 116 may include a table that cross-references the previous request(s) with the corresponding sending system(s). In another example implementation, the information 116 correlates the selected previous request(s) with endpoint(s) to which those previous request(s) are sent. For instance, the information 116 may include a table that cross-references the previous request(s) with the corresponding endpoint(s). In yet another example implementation, the information may correlate the selected previous request(s) with sending system(s) that send those previous request(s) and the endpoint(s) to which those previous request(s) are sent. In accordance with this implementation, the table that cross-references the previous request(s) with the corresponding sending system(s) and the table that cross-references the previous request(s) with the corresponding endpoint(s) may be the same or different.

Request-based forwarding logic 112 is configured to forward a current request, which is received directly or indirectly from a client device of the client devices 102A-102M, to an endpoint of the endpoints 108A-108P based on, at least in part, previous request(s). For example, request-based forwarding logic 112 may determine that the current request and the previous request(s) are received from a common sending system (e.g., a common client device or a common intermediate server(s)). In an aspect of this example, request-based forwarding logic 112 may further determine that the previous request(s) are sent to a designated endpoint. In accordance with this aspect, request-based forwarding logic 112 may forward the current request to the designated endpoint based on, at least in part, a determination that the previous request(s) are sent to the designated endpoint. Request-based forwarding logic 112 may forward the current request to the designated endpoint based on, at least in part, the information 116 indicating that the current request and the previous request(s) are received from a common sending system and/or that the previous request(s) are sent to the designated endpoint.

Example techniques for forwarding a request based on, at least in part, previous request(s) from the perspective of a forwarding server, such as any of forwarding servers 106A-106N, are discussed in greater detail below with reference to FIGS. 2-6.

An example scenario in which a request is forwarded based on, at least in part, previous request(s) will now be described with reference to forwarding system 100 to illustrate a flow of communication through forwarding system 100. As shown in FIG. 1, a client device of the first client devices 102A sends a first request 122 to first intermediate server(s) 104A via the first communication link 110A. The first request 122 includes a request to access a resource 120. For instance, the first request 122 may be a hypertext transfer protocol (HTTP) request.

First intermediate server(s) 104A send a second request 126, which is based on, at least in part, the first request 122, to first forwarding server 106A. The second request 126 includes the request to access the resource 120. For instance, the second request 126 may be a DNS request. In an example, first intermediate server(s) 104A may send the second request 126 exclusively to first forwarding server 106A, meaning that first intermediate server(s) 104A do not send the second request 126 to any of the other forwarding servers 106B-106N. In another example, the second request 126 may include other requests that are received from others of the first client devices 102A, in addition to the request for the resource 120 (e.g., in a batch request).

It will be recognized that first intermediate server(s) 104A may provide a previously cached response to the client device of the first client devices 102A that sends the first request 122 in response to receiving the first request 122. For instance, first intermediate server(s) 104A may provide the previously cached response in lieu of sending the second request 126 to first forwarding server 106A. If first intermediate server(s) 102A provides the previously cached response, further operations described below with regard to the example scenario need not necessarily be performed.

First intermediate server(s) 104A may send the second request 126 to first forwarding server 106A based on, at least in part, first forwarding server 106A being closer (in terms of latency) than any of the other forwarding servers 106B-106N that are capable of forwarding the request to access the resource 120 to first intermediate server(s) 104A. For instance, second forwarding server 106B may be closer (in terms of latency) than first forwarding server 106A to first intermediate server(s) 104A. However, second forwarding server 106B may be inoperable or otherwise incapable of forwarding the request for the resource 120. Accordingly, first intermediate server(s) 104A may send the second request 126 to first forwarding server 106A based on, at least in part, second forwarding server 106B being inoperable or otherwise incapable of forwarding the request for the resource 120.

First forwarding server 106A provides a second response 128 based on, at least in part, receipt of the second request 126. The second response 128 indicates that the request for the resource 120 is to be forwarded to the second endpoint 108B for illustrative purposes. For instance, the second response 128 may be a DNS response and/or a traffic management response. A traffic management response controls to which destination traffic (e.g., a resource request) from a client is sent. In one example implementation, first endpoint 108A may be closer (in terms of latency) than second endpoint 108B to first forwarding server 106A. However, first forwarding server 106A may determine that previous request(s) from first intermediate server 104A are associated with second forwarding server 106B. First forwarding server 106A may make this determination based on, at least in part, the information 116, which is stored in store 114. For example, the information 116 may indicate that second forwarding server 106B receives or responds to the previous request(s) or causes the previous request(s) to be forwarded. In accordance with this example, the information 116 may further indicate that the previous request(s) were forwarded to second endpoint 108B. Accordingly, first forwarding server 106A may provide the second response 126 to indicate that the request for the resource 120 is to be forwarded to the second endpoint 108B based on, at least in part, the information 116.

The second response 128 is shown in FIG. 1 to be provided to first intermediate server 104A for illustrative purposes. It will be recognized that first forwarding server 106A may provide the second response 128 to the client device of the first client devices 102A that sends the first request 122. For instance, first forwarding server 106A may send the second response 128 to the aforementioned client device rather than to first intermediate server 104A.

First intermediate server(s) 104A sends a third request 130 to second endpoint 108B based on, at least in part, receipt of the second response 128. The third request 130 includes the request to access the resource 120. For instance, the third request 130 may be a traffic management request. It will be recognized that the client device of the first client devices 102A that sends the first request 122, rather than first intermediate server(s) 104A, may send the third request 130. For example, in DNS, first intermediate server(s) 104A may be a DNS recursive resolver that does not see the third request 130. For instance, the third request 130 may be an HTTP request directly from the aforementioned client device of the first client devices 102A to endpoint 108B or indirectly from the aforementioned client device via another type of forwarding server to endpoint 108B.

Second endpoint 108B provides a third response 132 based on, at least in part, receipt of the third request 130. The third response 132 includes the resource 120 that is stored in store 118B. Second endpoint 108B may provide the third response to first intermediate server(s) 104A and/or the client device of the first client devices 102A from which the first request 122 is received.

Assuming that second endpoint 108B provides the third response 132 to first intermediate server(s) 104A, first intermediate server(s) 104A provide a first response 124 via the first communication link 110A to the client device of the first client devices 102A from which the first request 122 is received. The first response 124 includes the resource 120 from the third response 132.

In the example scenario described above, the request for the resource 120 is described as being provided from first client devices 102A to first forwarding server 106A via first intermediate server(s) 104A for illustrative purposes and is not intended to be limiting. It will be recognized that first client devices 102A may provide the request for the resource 120 to first forwarding server 106A without using an intermediate server, such as first intermediate server(s) 104A. For instance, first client device 102A may provide the request for the resource 120 directly to first forwarding server 106A.

In the example scenario, first forwarding server 106A is described as instructing first intermediate server(s) 104A to forward the request for the resource 120 to second endpoint 108B for illustrative purposes and is not intended to be limiting. It will be recognized that first forwarding server 106A may forward the request for the resource 120 to second endpoint 108B, rather than instructing first intermediate server(s) 104A to forward the request. For instance, first forwarding server 106 may forward the request for the resource 120 directly to second endpoint 108B.

Request-based forwarding logic 112 may be implemented in various ways to forward a current request based on, at least in part, previous request(s), including being implemented in hardware, software, firmware, or any combination thereof. For example, request-based forwarding logic 112 may be implemented as computer program code configured to be executed in one or more processors. In another example, request-based forwarding logic 112 may be implemented as hardware logic/electrical circuitry. For instance, request-based forwarding logic 112 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
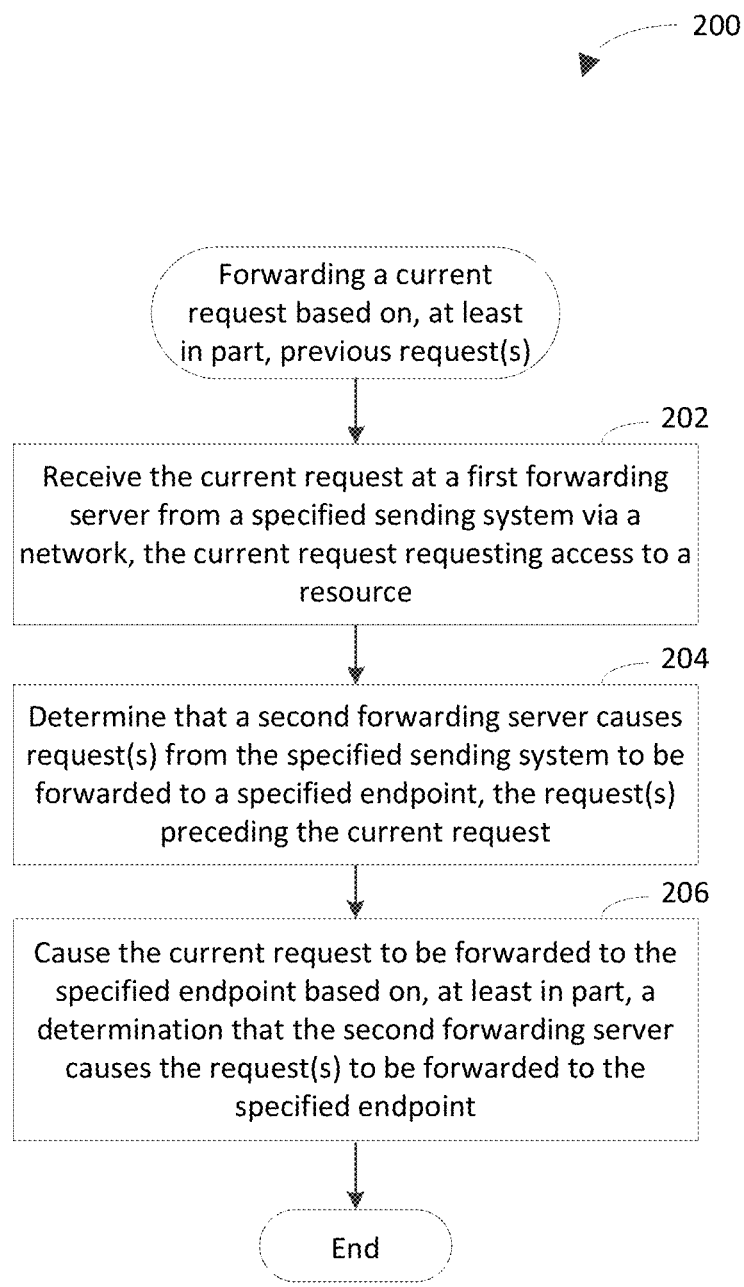
Figure 3:
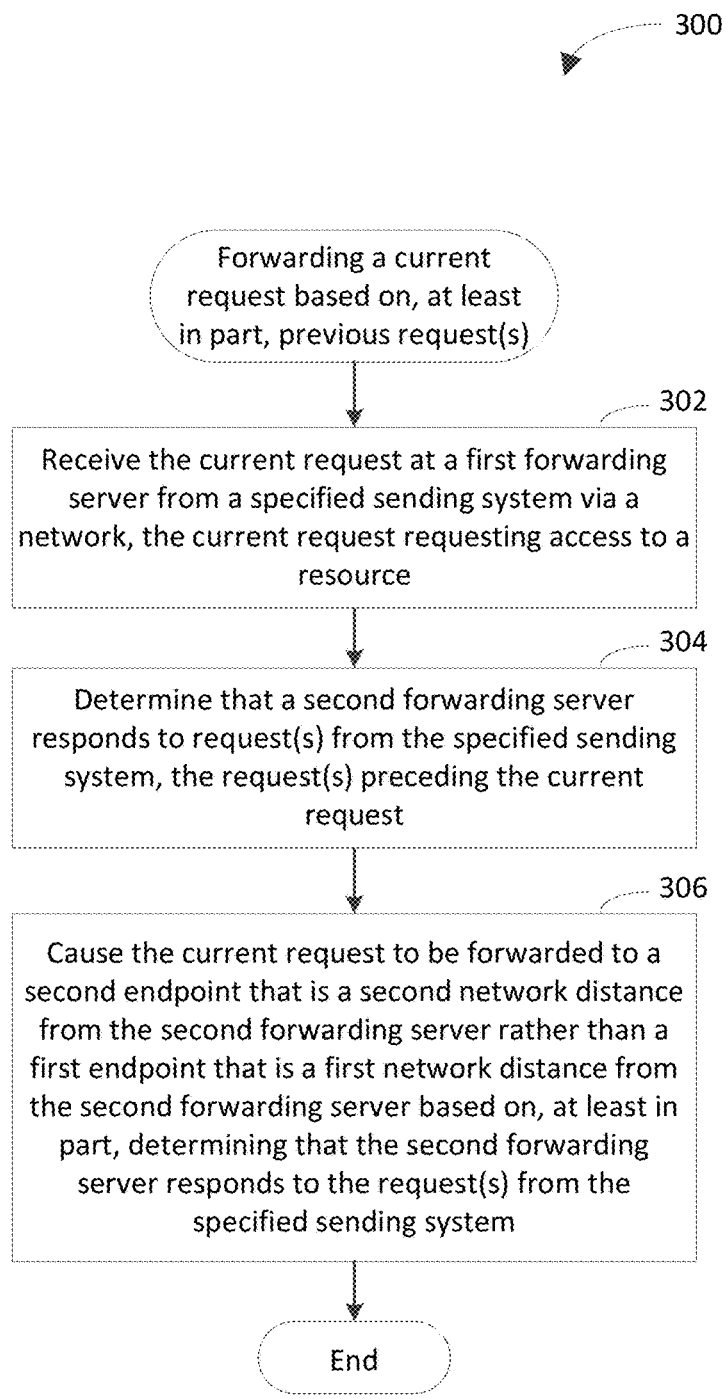
Figure 4:
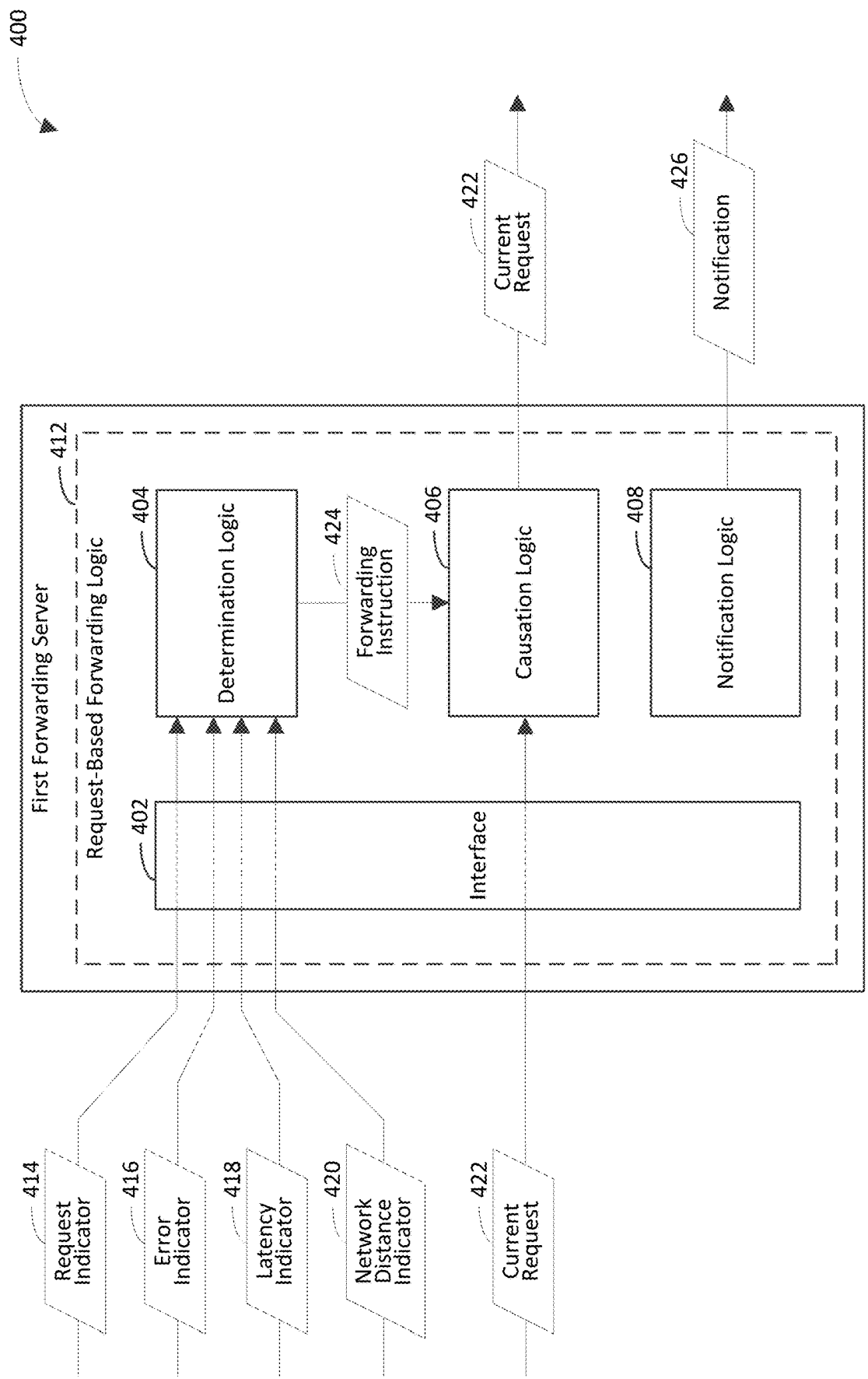
FIGS. 4 and 6 are block diagrams of example request-based forwarding logic shown in FIG. 1 in accordance with embodiments.

FIGS. 2 and 3 depict flowcharts 200 and 300 of example methods for forwarding current requests based on, at least in part, previous requests in accordance with embodiments. For instance, each of the methods may be performed in a networked system that includes a plurality of forwarding servers that are communicatively coupled to a plurality of sending systems via a network. The methods of flowcharts 200 and 300 will be described accordingly for non-limiting illustrative purposes. Flowcharts 200 and 300 may be performed by first forwarding server 106A shown in FIG. 1, for example. For illustrative purposes, flowcharts 200 and 300 are described with respect to first forwarding server 400 shown in FIG. 4. As shown in FIG. 4, first forwarding server 400 includes request-based forwarding logic 412. Request-based forwarding logic 400 includes an interface 402, determination logic 404, causation logic 406, and notification logic 408. Further structural and operational embodiments will be apparent to persons skilled in the relevant art(s) based on the discussion regarding flowcharts 200 and 300.

As shown in FIG. 2, the method of flowchart 200 begins at step 202. In step 202, the current request is received at a first forwarding server from a specified sending system via the network. The current request requests access to a resource (e.g., a computing software resource). In an example implementation, first forwarding server 400 receives a current request 422 at interface 402 from the specified sending system (e.g., a client device of first client devices 102A or an intermediate server of first intermediate server(s)) via the network (e.g., network 110). In accordance with this implementation, the current request 422 requests access to the resource (e.g., resource 120).

In an example embodiment, the current request is received at the first forwarding server in accordance with an anycast technique. For instance, the first forwarding server may be configured to be an anycast destination for receipt of the current request.

At step 204, a determination is made that a second forwarding server causes previous request(s) from the specified sending system to be forwarded to a specified endpoint. The previous request(s) precede the current request. In an example implementation, determination logic 404 determines that the second forwarding server (e.g., second forwarding server 106B) causes the previous request(s) from the specified sending system to be forwarded to the specified endpoint (e.g., second endpoint 108B). In accordance with this implementation, determination logic 404 may generate a forwarding instruction 424 in response to (e.g., based on) the determination that the second forwarding server causes the previous request(s) from the specified sending system to be forwarded to the specified endpoint. For instance, the forwarding instruction 424 may specify that the current request 422 is to be forwarded to the specified endpoint.

In an example embodiment, the specified endpoint may be included in a plurality of endpoints. In accordance with this embodiment, each of the plurality of endpoints may be capable of providing (e.g., configured to provide) the resource in response to receipt of a request for the resource.

At step 206, the current request is caused to be forwarded to the specified endpoint based on, at least in part, the determination that the second forwarding server causes the previous request(s) to be forwarded to the specified endpoint. The current request may be caused to be forwarded to the specified endpoint further based on, at least in part, other factor(s), though the scope of the example embodiments is not limited in this respect. For instance, the current request may be caused to be forwarded to the specified endpoint further based on, at least in part, a version of the resource stored at the specified endpoint being more relevant to the current request.

In an example implementation, causation logic 406 causes the current request 422 to be forwarded to the specified endpoint (e.g., rather than another endpoint) based on, at least in part, the determination that the second forwarding server causes the previous request(s) to be forwarded to the specified endpoint. For example, causation logic 406 may forward the current request 422 to the specified endpoint. In another example, causation logic 406 may instruct the specified sending system to forward the current request 422 to the specified endpoint. In accordance with this implementation, causation logic 406 may cause the current request 422 to be forwarded to the specified endpoint further based on, at least in part, a time at which the second forwarding server causes the previous request(s) to be forwarded to the specified endpoint being within a specified amount of time prior to a time at which first forwarding server 400 receives the current request 422. For instance, the specified amount of time may be one hour, two hours, six hours, twelve hours, 24 hours, one week, etc.

In an example embodiment, the current request is caused to be forwarded to the specified endpoint at step 206 in absence of a global network distance map (e.g., a source address map), which indicates (e.g., includes) a network distance from each of the plurality of sending systems to each of the plurality of forwarding servers. A network distance from A to B is defined as an amount of latency and/or cost associated with a communication from A to B and/or from B to A. For instance, a network distance may correspond to (e.g., may be) a geographical distance, though it will be recognized that the network distance need not necessarily correspond to the geographical distance.

In another example embodiment, a global network distance map indicates a latency associated with a communication path between each sending system in a subset of the plurality of sending systems and each forwarding server in a subset of the plurality of forwarding servers. In accordance with this embodiment, the current request is caused to be forwarded to the specified endpoint at step 206 further based on, at least in part, the global network distance map not indicating a latency associated with a communication path between the specified sending system and the first forwarding server.

In yet another example embodiment, the current request and the previous request(s), which precede the current request, are included in a plurality of requests. In accordance with this embodiment, each of a plurality of affinity data indicates which of the plurality of forwarding servers causes a respective request of the plurality of requests to be forwarded to an endpoint. In further accordance with this embodiment, a plurality of weights that are assigned to the plurality of respective affinity data decrease with respect to time.

In still another example embodiment, the method of flowchart 200 may be a method of performing domain name system-based (DNS-based) traffic management. In accordance with this embodiment, the plurality of forwarding servers may be a plurality of respective name servers. For instance, each name server may be a respective DNS server.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 includes receiving a request indicator at the first forwarding server from the second forwarding server via the network. For example, first forwarding server 400 may receive a request indicator 414 at interface 402 from the second forwarding server. In accordance with this embodiment, the request indicator (e.g., request indicator 414) indicates that the second forwarding server causes the previous request(s) to be forwarded to the specified endpoint. In further accordance with this embodiment, the determination that the second forwarding server causes the previous request(s) to be forwarded to the specified endpoint is made at step 204 based on, at least in part, the request indicator indicating that the second forwarding server causes the previous request(s) to be forwarded to the specified endpoint. For instance, determination logic 404 may determine that the second forwarding server causes the previous request(s) to be forwarded to the specified endpoint based on, at least in part, the request indictor 414 indicating that the second forwarding server causes the previous request(s) to be forwarded to the specified endpoint.

In another example embodiment, the method of flowchart 200 includes notifying third forwarding server(s) of the plurality of forwarding servers, by the first forwarding server, that a second latency associated with a second communication path between the second forwarding server and the specified sending system is less than a first latency associated with a first communication path between the first forwarding server and the specified sending system. For instance, notification logic 408 may provide a notification 426, which specifies that the second latency is less than the first latency. It will be recognized that the second forwarding server, in addition to or in lieu of the first forwarding server, may notify the third forwarding server(s) that the second latency is less than the first latency.

In yet another example embodiment, the method of flowchart 200 includes receiving a latency indicator from the second forwarding server at the first forwarding server. For example, first forwarding server 400 may receive a latency indicator 418 at interface 402 from the second forwarding server. The latency indicator (e.g., latency indicator 418) indicates that a latency associated with a second communication path between the second forwarding server and the specified sending system is less than or equal to each of a plurality of latencies associated with other respective communication paths between other respective forwarding servers of the plurality of forwarding servers and the specified sending system. In accordance with this embodiment, the method of flowchart 200 further includes determining that an error occurs with regard to operation of the second forwarding server. For example, determination logic 404 may determine that the error occurs based on, at least in part, receipt of an error indicator 416 at interface 402. In accordance with this example, the error indicator 416 may specify that the error occurs with regard to the operation of the second forwarding server. For instance, the error indicator 416 may be received at the interface 402 from an intermediate server or another forwarding server. In another example, determination logic 404 may infer that the error occurs based on, at least in part, receipt of the current request 422.

In further accordance with this embodiment, the determination that the second forwarding server causes the previous request(s) to be forwarded to the specified endpoint is made at step 204 in response to receiving the latency indicator. For instance, determination logic 404 may determine that the second forwarding server cases the previous request(s) to be forwarded to the specified endpoint in response to receiving the latency indicator 418. In further accordance with this embodiment, the current request is caused to be forwarded to the specified endpoint at step 206 in response to determining that the error occurs with regard to the operation of the second forwarding server. For instance, causation logic 406 may cause the current request 422 to be forwarded to the specified endpoint in response to receipt of the error indicator 416.

In still another example embodiment, the method of flowchart 200 includes determining whether the specified endpoint is available and whether the specified endpoint has the resource. For instance, determination logic 404 may determine whether the specified endpoint is available and whether the specified endpoint has the resource 120. In accordance with this embodiment, the current request is caused to be forwarded to the specified endpoint a step 206 further based on, at least in part, a determination that the specified endpoint is available and that the specified endpoint has the resource. For example, causation logic 406 may cause the current request 422 to be forwarded to the specified endpoint further based on, at least in part, the determination that the specified endpoint is available and that the specified endpoint has the resource 120. In accordance with this example, determination logic 404 may generate the forwarding instruction 424 in response to determining that the specified endpoint is available and that the specified endpoint has the resource 120.

As shown in FIG. 3, the method of flowchart 300 begins at step 302. In step 302, the current request is received at a first forwarding server from a specified sending system via a network. The current request requests access to a resource (e.g., a computing software resource). The current request may be received at the first forwarding server in accordance with an anycast technique, though the example embodiments are not limited in this respect. In an example implementation, first forwarding server 400 receives a current request 422 at interface 402 from the specified sending system (e.g., a client device of first client devices 102A or an intermediate server of first intermediate server(s)) via the network (e.g., network 110). In accordance with this implementation, the current request 422 requests access to the resource (e.g., resource 120).

At step 304, a determination is made that a second forwarding server responds to previous request(s) from the specified sending system. The previous request(s) precede the current request. In an example implementation, determination logic 404 determines that the second forwarding server (e.g., second forwarding server 106B) responds to the previous request(s) from the specified sending system. In accordance with this implementation, determination logic 404 may generate a forwarding instruction 424 in response to (e.g., based on) the determination that the second forwarding server (e.g., second forwarding server 106B) responds to the previous request(s) from the specified sending system.

At step 306, the current request is caused to be forwarded to a second endpoint that is a second network distance from the second forwarding server rather than a first endpoint that is a first network distance from the second forwarding server based on, at least in part, determining that the second forwarding server responds to the previous request(s) from the specified sending system. The second network distance is less than the first network distance. The second endpoint is a third network distance from the first forwarding server. The first endpoint is a fourth network distance from the first forwarding server. The fourth network distance is less than the third network distance.

In an example implementation, causation logic 406 causes the current request 422 to be forwarded to the second endpoint (e.g., second endpoint 106B) based on, at least in part, the determination that the second forwarding server causes the previous request(s) to be forwarded to the second endpoint. For instance, causation logic 406 may cause the current request 422 to be forwarded to the second endpoint rather than to another endpoint based on, at least in part, the determination. For example, causation logic 406 may forward the current request 422 to the second endpoint. In another example, causation logic 406 may instruct the specified sending system to forward the current request 422 to the second endpoint. In accordance with this implementation, causation logic 406 may cause the current request 422 to be forwarded to the second endpoint further based on, at least in part, a time at which the second forwarding server causes the previous request(s) to be forwarded to the second endpoint being within a specified amount of time prior to a time at which first forwarding server 400 receives the current request 422.

In an example embodiment, the current request is caused to be forwarded to the second endpoint at step 306 in absence of a global network distance map, which indicates a network distance from each of the plurality of sending systems to each of the plurality of forwarding servers.

In another example embodiment, a global network distance map includes a network distance from each sending system in a subset of the plurality of sending systems to each forwarding server in a subset of the plurality of forwarding servers. In accordance with this embodiment, the current request is caused to be forwarded to the second endpoint at step 306 further based on, at least in part, the global network distance map not indicating a network distance from the specified sending system to the first forwarding server.

In yet another example embodiment, the current request and the previous request(s), which precede the current request, are included in a plurality of requests. In accordance with this embodiment, each of a plurality of affinity data indicates which of the plurality of forwarding servers responds to a respective request of the plurality of requests. In further accordance with this embodiment, a plurality of weights that are assigned to the plurality of respective affinity data decrease with respect to time.

In still another example embodiment, the method of flowchart 300 may be a method of performing DNS-based traffic management. In accordance with this embodiment, the first and second forwarding servers may be first and second name servers, respectively. For instance, the first and second name servers may be respective DNS servers.

In some example embodiments, one or more steps 302, 304, and/or 306 of flowchart 300 may not be performed. Moreover, steps in addition to or in lieu of steps 302, 304, and/or 306 may be performed. For instance, in an example embodiment, the method of flowchart 300 includes receiving a request indicator at the first forwarding server from the second forwarding server via the network. For example, first forwarding server 400 may receive a request indicator 414 at interface 402 from the second forwarding server. In accordance with this embodiment, the request indicator (e.g., request indicator 414) indicates that the second forwarding server responds to the previous request(s) from the specified sending system. In further accordance with this embodiment, the determination that the second forwarding server responds to the previous request(s) from the specified sending system is made at step 304 based on, at least in part, the request indicator indicating that the second forwarding server responds to the previous request(s) from the specified sending system. For instance, determination logic 404 may determine that the second forwarding server responds to the previous request(s) from the specified sending system based on, at least in part, the request indictor 414 indicating that the second forwarding server responds to the previous request(s) from the specified sending system.

In another example embodiment, the method of flowchart 300 includes notifying third forwarding server(s) of the plurality of forwarding servers, by the first forwarding server, that a network distance between the second forwarding server and the specified sending system is less than a network distance between the first forwarding server and the specified sending system. For instance, notification logic 408 may provide a notification 426, which specifies that the network distance between the second forwarding server and the specified sending system is less than the network distance between the first forwarding server and the specified sending system. It will be recognized that the second forwarding server, in addition to or in lieu of the first forwarding server, may notify the third forwarding server(s) that the network distance between the second forwarding server and the specified sending system is less than the network distance between the first forwarding server and the specified sending system.

In yet another example embodiment, the method of flowchart 300 includes receiving a network distance indicator from the second forwarding server at the first forwarding server. For example, first forwarding server 400 may receive a network distance indicator 420 at interface 402 from the second forwarding server. The network distance indicator (e.g., network distance indicator 420) indicates that a network distance between the second forwarding server and the specified sending system is less than or equal to a network distance between each other forwarding server of the plurality of forwarding servers and the specified sending system. In accordance with this embodiment, the method of flowchart 300 further includes determining that an error occurs with regard to operation of the second forwarding server. For example, determination logic 404 may determine that the error occurs based on, at least in part, receipt of an error indicator 416 at interface 402. In accordance with this example, the error indicator 416 may specify that the error occurs with regard to the operation of the second forwarding server. For instance, the error indicator 416 may be received at the interface 402 from an intermediate server or another forwarding server.

In further accordance with this embodiment, the determination that the second forwarding server responds to the previous request(s) from the specified sending system is made at step 304 in response to receiving the network distance indicator. For instance, determination logic 404 may determine that the second forwarding server responds to the previous request(s) from the specified sending system in response to receiving the network distance indicator 420. In further accordance with this embodiment, the current request is caused to be forwarded to the second endpoint at step 306 in response to determining that the error occurs with regard to the operation of the second forwarding server. For instance, causation logic 406 may cause the current request 422 to be forwarded to the specified endpoint in response to receipt of the error indicator 416.

It will be recognized that first forwarding server 400 may not include one or more of interface 402, determination logic 404, causation logic 406, and/or notification logic 408. Furthermore, first forwarding server 400 may include components in addition to or in lieu of interface 402, determination logic 404, causation logic 406, and/or notification logic 408.

Figure 5:
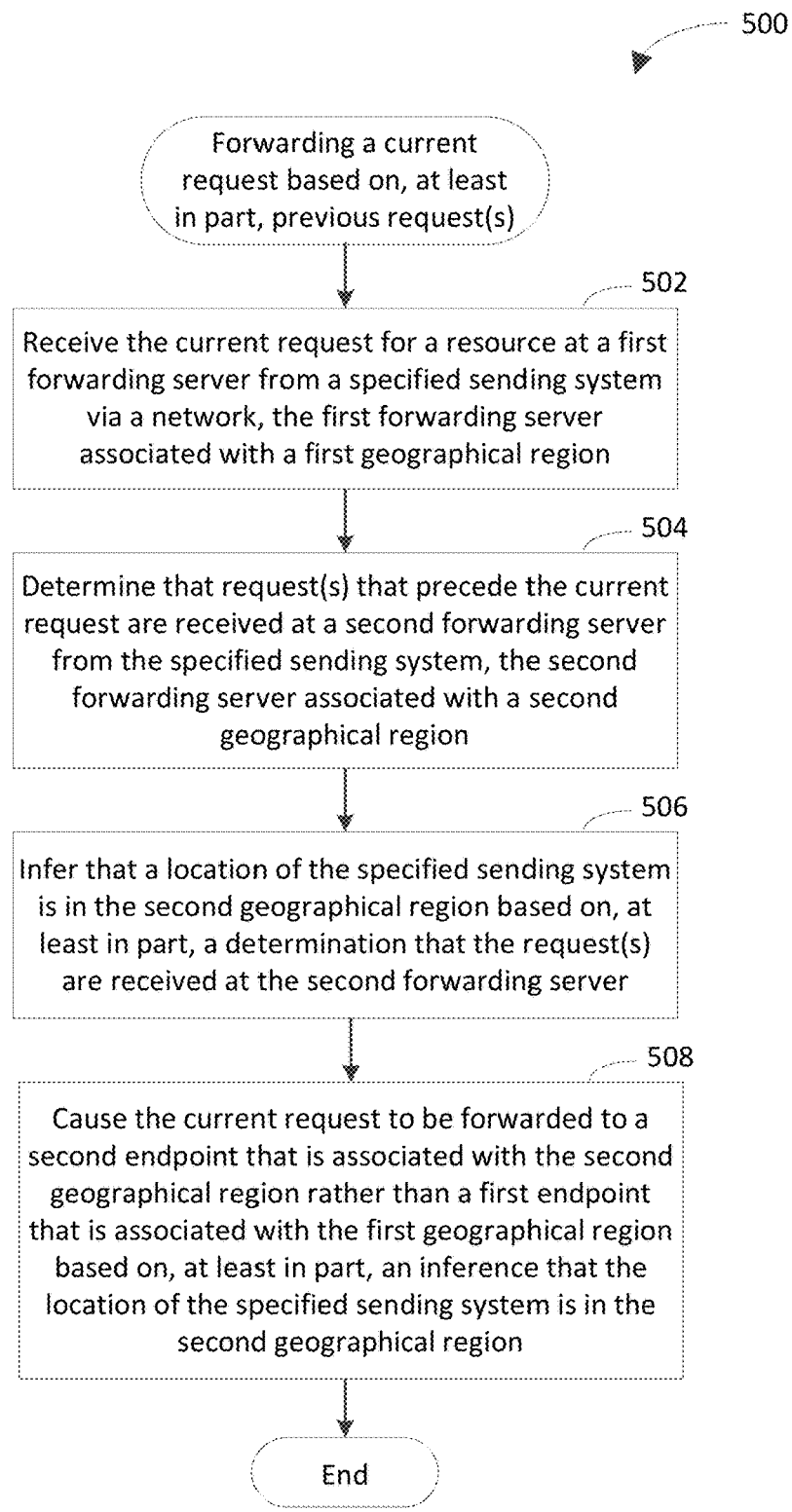
Figure 6:
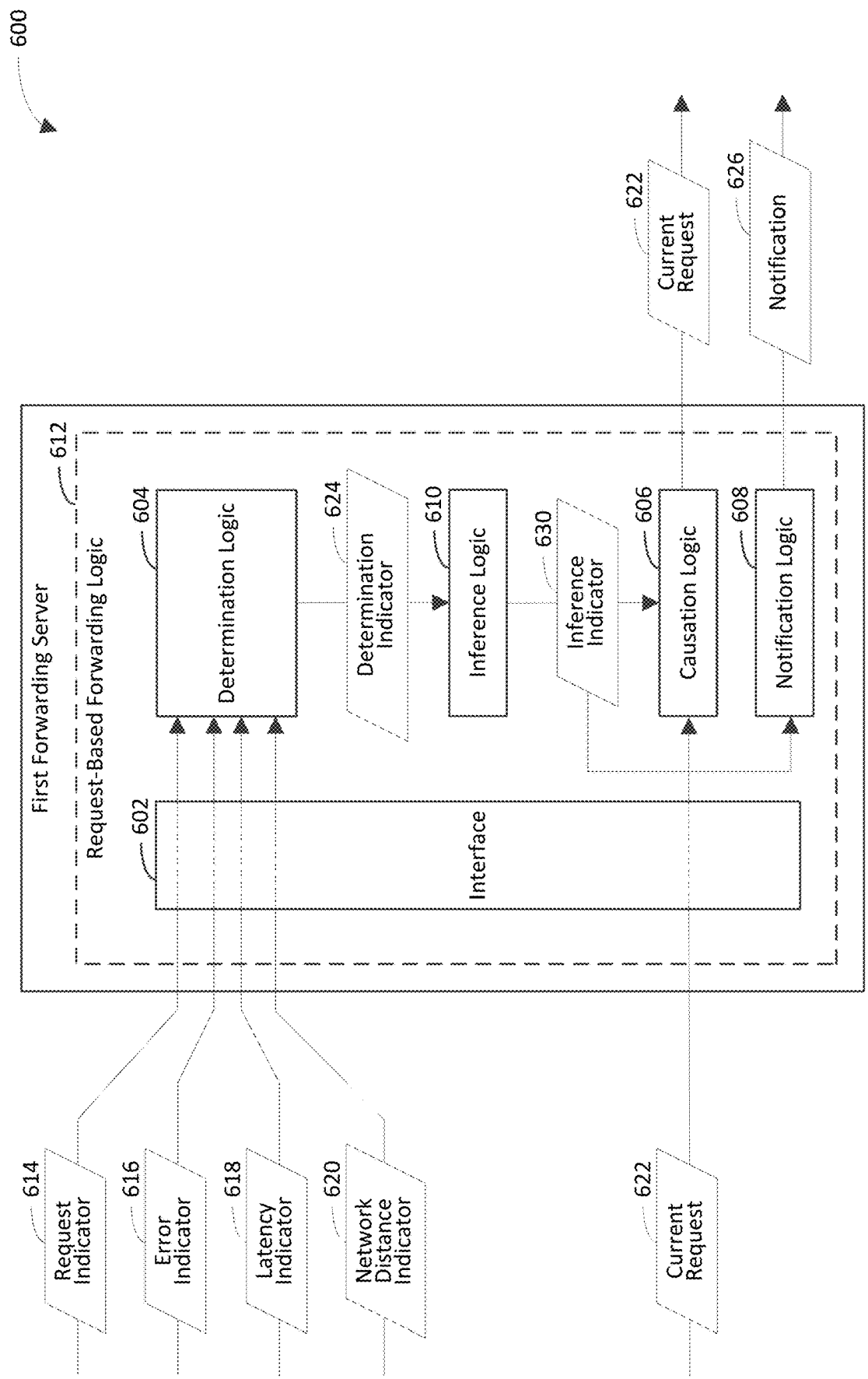

FIG. 5 depicts a flowchart 500 of another example method for forwarding a current request based on, at least in part, previous request(s) in accordance with an embodiment. For instance, the method may be performed in a networked system that includes a plurality of forwarding servers that are communicatively coupled to a plurality of sending systems via a network. The method of flowchart 500 will be described accordingly for non-limiting illustrative purposes. Flowchart 500 may be performed by first forwarding server 106A shown in FIG. 1, for example. For illustrative purposes, flowchart 500 is described with first forwarding server 600 shown in FIG. 6. As shown in FIG. 6, first forwarding server 600 includes request-based forwarding logic 612. Request-based forwarding logic 612 includes an interface 602, determination logic 604, causation logic 606, notification logic 608, and inference logic 610. Further structural and operational embodiments will be apparent to persons skilled in the relevant art(s) based on the discussion regarding flowchart 500.

As shown in FIG. 5, the method of flowchart 500 begins at step 502. In step 502, the current request for a resource (e.g., a computing software resource) is received at a first forwarding server from a specified sending system via a network. The first forwarding server is associated with a first geographical region. The current request may be received at the first forwarding server in accordance with an anycast technique, though the example embodiments are not limited in this respect. In an example implementation, first forwarding server 600 receives a current request 622 for a resource 120 at interface 602 from the specified sending system (e.g., a client device of first client devices 102A or an intermediate server of first intermediate server(s)) via the network (e.g., network 110).

At step 504, a determination is made that previous request(s) that precede the current request are received at a second forwarding server from the specified sending system. The second forwarding server is associated with a second geographical region. In an example implementation, determination logic 604 determines that the previous request(s) that precede the current request 622 are received at the second forwarding server (e.g., second forwarding server 106B) from the specified sending system. In accordance with this implementation, determination logic 604 may generate a determination indicator 424 in response to (e.g., based on) the determination that the previous request(s) are received at the second forwarding server from the specified sending system. For instance, the determination indicator 624 may specify that the previous request(s) are received from the specified sending system at the second forwarding server, which is associated with the second geographical region.

At step 506, an inference is made that a location of the specified sending system is in the second geographical region based on, at least in part, a determination that the previous request(s) are received at the second forwarding server. In an example implementation, inference logic 610 infers that the location of the specified sending system is in the second geographical region based on, at least in part, the determination that the previous request(s) are received at the second forwarding server. For instance, inference logic 610 may infer that the location of the specified sending system is in the second geographical region base on the determination indicator 624. In accordance with this implementation, inference logic 610 may generate an inference indicator 630. The inference indicator 630 may specify that location of the specified sending system is in the second geographical region.

At step 508, the current request is caused to be forwarded to a second endpoint that is associated with the second geographical region rather than a first endpoint that is associated with the first geographical region based on, at least in part, the inference that the location of the specified sending system is in the second geographical region. In an example implementation, causation logic 606 causes the current request 622 to be forwarded to a second endpoint (e.g., second endpoint 108B) that is associated with the second geographical region rather than a first endpoint (e.g., first endpoint 108A) that is associated with the first geographical region based on, at least in part, the inference that the location of the specified sending system is in the second geographical region. For example, causation logic 606 may forward the current request 622 to the second endpoint. In another example, causation logic 606 may instruct the specified sending system to forward the current request 622 to the second endpoint. In accordance with this implementation, causation logic 606 may cause the current request 622 to be forwarded to the second endpoint further based on, at least in part, a time at which the second forwarding server receives the previous request(s) being within a specified amount of time prior to a time at which first forwarding server 600 receives the current request 622.

In an example embodiment, the current request is caused to be forwarded to the second endpoint at step 508 further based on, at least in part, a second version of the computing software resource that is available from the second endpoint being more relevant to the current request than a first version of the computing software resource that is available from the first endpoint.

In another example embodiment, the current request is cased to be forwarded to the second endpoint at step 508 in absence of a global network distance map, which indicates a network distance from each of the plurality of sending systems to each of the plurality of forwarding servers.

In yet another example embodiment, a global network distance map includes a network distance from each sending system in a subset of the plurality of sending systems to each forwarding server in a subset of the plurality of forwarding servers. In accordance with this embodiment, the current request is caused to be forwarded to the second endpoint at step 508 further based on, at least in part, the global network distance map not indicating a network distance from the specified sending system to the first forwarding server.

In still another example embodiment, the current request and the previous request(s), which precede the current request, are included in a plurality of requests. In accordance with this embodiment, each of a plurality of affinity data indicates which of the plurality of forwarding servers receives a respective request of the plurality of requests. In further accordance with this embodiment, a plurality of weights that are assigned to the plurality of respective affinity data decrease with respect to time.

In yet another example embodiment, the method of flowchart 500 may be a method of performing DNS-based traffic management. In accordance with this embodiment, the plurality of forwarding servers may be a plurality of respective name servers. For instance, each name server may be a respective DNS server.

In some example embodiments, one or more steps 502, 504, 506, and/or 508 of flowchart 500 may not be performed. Moreover, steps in addition to or in lieu of steps 502, 504, 506, and/or 508 may be performed. For instance, in an example embodiment, the method of flowchart 500 includes receiving a request indicator at the first forwarding server from the second forwarding server via the network. For example, first forwarding server 600 may receive a request indicator 614 at interface 602 from the second forwarding server. The request indicator (e.g., request indicator 614) indicates that the second forwarding server receives the previous request(s) from the specified sending system. In accordance with this embodiment, the determination that the previous request(s), which precede the current request, are received at the second forwarding server is made at step 504 based on, at least in part, the request indicator indicating that the second forwarding server receives the previous request(s) from the specified sending system. For instance, determination logic 604 may determine that the second forwarding server receives the previous request(s) based on, at least in part, the request indictor 614 indicating that the second forwarding server receives the previous request(s) from the specified sending system.

In another example embodiment, the method of flowchart 500 includes notifying third forwarding server(s) of the plurality of forwarding servers, by the first forwarding server, that the location of the specified sending system is in the second geographical region. For instance, notification logic 608 may provide a notification 626, which specifies that the location of the specified sending system is in the second geographical region. It will be recognized that the second forwarding server, in addition to or in lieu of the first forwarding server, may notify the third forwarding server(s) that the location of the specified sending system is in the second geographical region.

In yet another example embodiment, the method of flowchart 500 includes receiving a network distance indicator from the second forwarding server at the first forwarding server. For example, first forwarding server 600 may receive a network distance indicator 620 at interface 602 from the second forwarding server. The network distance indicator (e.g., network distance indicator 618) indicates that a network distance between the second forwarding server and the specified sending system is less than or equal to a network distance between each other forwarding server of the plurality of forwarding servers and the specified sending system. In accordance with this embodiment, the method of flowchart 500 further includes determining that an error occurs with regard to operation of the second forwarding server. For example, determination logic 604 may determine that the error occurs based on, at least in part, receipt of an error indicator 616 at interface 602. In accordance with this example, the error indicator 616 may specify that the error occurs with regard to the operation of the second forwarding server. For instance, the error indicator 616 may be received at the interface 602 from an intermediate server or another forwarding server.

In further accordance with this embodiment, the determination that the previous request(s) are received at the second forwarding server is made at step 504 in response to receiving the network distance indicator. For instance, determination logic 604 may determine that the second forwarding server receives the previous request(s) from the specified sending system in response to receiving the network distance indicator 620. In further accordance with this embodiment, the current request is caused to be forwarded to the second endpoint at step 508 in response to determining that the error occurs with regard to the operation of the second forwarding server. For instance, causation logic 606 may cause the current request 622 to be forwarded to the specified endpoint in response to receipt of the error indicator 616.

It will be recognized that first forwarding server 600 may not include one or more of interface 602, determination logic 604, causation logic 606, notification logic 608, and/or inference logic 610. Furthermore, first forwarding server 600 may include components in addition to or in lieu of interface 602, determination logic 604, causation logic 606, notification logic 608, and/or inference logic 610.

Any one or more of client devices 102A-102M, any one or more of intermediate servers 104A-104M, any one or more of forwarding servers 106A-106N, any one or more of endpoints 108A-108P, request-based forwarding logic 112, determination logic 404, causation logic 406, notification logic 408, determination logic 604, causation logic 606, notification logic 608, inference logic 610, flowchart 200, flowchart 300, and/or flowchart 500 may be implemented in hardware, software, firmware, or any combination thereof.

For example, any one or more of client devices 102A-102M, any one or more of intermediate servers 104A-104M, any one or more of forwarding servers 106A-106N, any one or more of endpoints 108A-108P, request-based forwarding logic 112, determination logic 404, causation logic 406, notification logic 408, determination logic 604, causation logic 606, notification logic 608, inference logic 610, flowchart 200, flowchart 300, and/or flowchart 500 may be implemented, at least in part, as computer program code configured to be executed in one or more processors.

In another example, any one or more of client devices 102A-102M, any one or more of intermediate servers 104A-104M, any one or more of forwarding servers 106A-106N, any one or more of endpoints 108A-108P, request-based forwarding logic 112, determination logic 404, causation logic 406, notification logic 408, determination logic 604, causation logic 606, notification logic 608, inference logic 610, flowchart 200, flowchart 300, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In a first example networked system that includes a plurality of forwarding servers that are communicatively coupled to a plurality of sending systems via a network, the plurality of forwarding servers include at least a first forwarding server and a second forwarding server. The first forwarding server comprises at least one element, an interface, determination logic, and causation logic. The at least one element comprises at least one of (a) one or more processors or (b) hardware logic/electrical circuitry. The interface is configured to receive a current request from a specified sending system of the plurality of sending systems via the network. The current request requests access to a computing software resource. The determination logic, implemented using the at least one element, is configured to determine whether the second forwarding server causes one or more previous requests from the specified sending system to be forwarded to a specified endpoint of a plurality of endpoints. The one or more previous requests precede the current request. The causation logic, implemented using the at least one element, is configured to cause the current request to be forwarded to the specified endpoint based on, at least in part, a determination that the second forwarding server causes the one or more previous requests to be forwarded to the specified endpoint.

In a first aspect of the first forwarding server in the first example network, the interface is configured to receive a request indicator from the second forwarding server via the network. In accordance with the first aspect, the causation logic is configured to cause the current request to be forwarded to the specified endpoint based on, at least in part, the request indicator indicating that the second forwarding server causes the one or more previous requests to be forwarded to the specified endpoint.

In a second aspect of the first forwarding server in the first example network, the first forwarding server further comprises notification logic configured to notify one or more third forwarding servers of the plurality of forwarding servers that a second latency associated with a second communication path between the second forwarding server and the specified sending system is less than a first latency associated with a first communication path between the first forwarding server and the specified sending system. The second aspect of the first forwarding server in the first example network may be implemented in combination with the first aspect of the first forwarding server in the first example network, though the example embodiments are not limited in this respect.

In a third aspect of the first forwarding server in the first example network, the current request and the one or more previous requests are included in a plurality of requests. In accordance with the third aspect, each of a plurality of affinity data indicates which of the plurality of forwarding servers causes a respective request of the plurality of requests to be forwarded to an endpoint. In further accordance with the third aspect, a plurality of weights that are assigned to the plurality of respective affinity data decrease with respect to time. The third aspect of the first forwarding server in the first example network may be implemented in combination with the first and/or second aspect of the first forwarding server in the first example network, though the example embodiments are not limited in this respect.

In a fourth aspect of the first forwarding server in the first example network, the interface is configured to receive a latency indicator from the second forwarding server, the latency indicator indicating that a latency associated with a second communication path between the second forwarding server and the specified sending system is less than or equal to each of a plurality of latencies associated with other respective communication paths between other respective forwarding servers of the plurality of forwarding servers and the specified sending system. In accordance with the fourth aspect, the determination logic is further configured to determine whether an error occurs with regard to operation of the second forwarding server. In further accordance with the fourth aspect, the determination logic is configured to determine whether the second forwarding server causes the one or more previous requests to be forwarded to the specified endpoint in response to receipt of the latency indicator. In further accordance with the fourth aspect, the causation logic is configured to cause the current request to be forwarded to the specified endpoint in response to a determination that the error occurs with regard to the operation of the second forwarding server. The fourth aspect of the first forwarding server in the first example network may be implemented in combination with the first, second, and/or third aspect of the first forwarding server in the first example network, though the example embodiments are not limited in this respect.

In a fifth aspect of the first forwarding server in the first example network, the current request is an anycast request. The fifth aspect of the first forwarding server in the first example network may be implemented in combination with the first, second, third, and/or fourth aspect of the first forwarding server in the first example network, though the example embodiments are not limited in this respect.

In a sixth aspect of the first forwarding server in the first example network, the causation logic is configured to cause the current request to be forwarded to the specified endpoint in absence of a global network distance map, which indicates a network distance from each of the plurality of sending systems to each of the plurality of forwarding servers. The sixth aspect of the first forwarding server in the first example network may be implemented in combination with the first, second, third, fourth, and/or fifth aspect of the first forwarding server in the first example network, though the example embodiments are not limited in this respect.

In a seventh aspect of the first forwarding server in the first example network, the causation logic is configured to cause the current request to be forwarded to the specified endpoint further based on, at least in part, a global network distance map, which indicates a latency associated with a communication path between each sending system in a subset of the plurality of sending systems and each forwarding server in a subset of the plurality of forwarding servers, not indicating a latency associated with a communication path between the specified sending system and the first forwarding server. The seventh aspect of the first forwarding server in the first example network may be implemented in combination with the first, second, third, fourth, and/or fifth aspect of the first forwarding server in the first example network, though the example embodiments are not limited in this respect.

In a second example networked system that includes a plurality of forwarding servers that are communicatively coupled to a plurality of sending systems via a network, the plurality of forwarding servers include at least a first forwarding server and a second forwarding server. The first forwarding server comprises at least one element, an interface, determination logic, inference logic, and causation logic. The at least one element comprises at least one of (a) one or more processors or (b) hardware logic/electrical circuitry. The interface is configured to receive a current request for a computing software resource from a specified sending system of the plurality of sending systems via the network. The first forwarding server is associated with a first geographical region. The determination logic, implemented using the at least one element, is configured to determine whether one or more previous requests that precede the current request are received at the second forwarding server from the specified sending system. The second forwarding server is associated with a second geographical region. The inference logic, implemented using the at least one element, is configured to infer that a location of the specified sending system is in the second geographical region based on, at least in part, a determination that the one or more previous requests are received at the second forwarding server. The causation logic, implemented using the at least one element, is configured to cause the current request to be forwarded to a second endpoint that is associated with the second geographical region rather than a first endpoint that is associated with the first geographical region based on, at least in part, an inference that the location of the specified sending system is in the second geographical region.

In a first aspect of the first forwarding server in the second example network, the causation logic is configured to cause the current request to be forwarded to the second endpoint further based on, at least in part, a second version of the computing software resource that is available from the second endpoint being more relevant to the current request than a first version of the computing software resource that is available from the first endpoint.

In a second aspect of the first forwarding server in the second example network, the interface is configured to receive a request indicator from the second forwarding server via the network. In accordance with the second aspect, the causation logic is configured to cause the current request to be forwarded to the second endpoint based on, at least in part, the request indicator indicating that the second forwarding server receives the one or more previous requests from the specified sending system. The second aspect of the first forwarding server in the second example network may be implemented in combination with the first aspect of the first forwarding server in the second example network, though the example embodiments are not limited in this respect.

In a third aspect of the first forwarding server in the second example network, the first forwarding server further comprises notification logic configured to notify one or more third forwarding servers of the plurality of forwarding servers that the location of the specified sending system is in the second geographical region. The third aspect of the first forwarding server in the second example network may be implemented in combination with the first and/or second aspect of the first forwarding server in the second example network, though the example embodiments are not limited in this respect.

In a fourth aspect of the first forwarding server in the second example network, the current request and the one or more previous requests are included in a plurality of requests. In accordance with the fourth aspect, each of a plurality of affinity data indicates which of the plurality of forwarding servers receives a respective request of the plurality of requests. In further accordance with the fourth aspect, a plurality of weights that are assigned to the plurality of respective affinity data decrease with respect to time. The fourth aspect of the first forwarding server in the second example network may be implemented in combination with the first, second, and/or third aspect of the first forwarding server in the second example network, though the example embodiments are not limited in this respect.

In a fifth aspect of the first forwarding server in the second example network, the interface is configured to receive a network distance indicator from the second forwarding server. The network distance indicator indicates that a network distance between the second forwarding server and the specified sending system is less than or equal to a network distance between each other forwarding server of the plurality of forwarding servers and the specified sending system. In accordance with the fifth aspect, the determination logic is further configured to determine whether an error occurs with regard to operation of the second forwarding server. In further accordance with the fifth aspect, the determination logic is configured to determine that the one or more previous requests are received at the second forwarding server in response to receiving the network distance indicator. In further accordance with the fifth aspect, the causation logic is configured to cause the current request to be forwarded to the second endpoint in response to a determination that the error occurs with regard to the operation of the second forwarding server. The fifth aspect of the first forwarding server in the second example network may be implemented in combination with the first, second, third, and/or fourth aspect of the first forwarding server in the second example network, though the example embodiments are not limited in this respect.

In a sixth aspect of the first forwarding server in the second example network, the current request is an anycast request. The sixth aspect of the first forwarding server in the second example network may be implemented in combination with the first, second, third, fourth, and/or fifth aspect of the first forwarding server in the second example network, though the example embodiments are not limited in this respect.

In a seventh aspect of the first forwarding server in the second example network, the causation logic is configured to cause the current request to be forwarded to the second endpoint in absence of a global network distance map, which indicates a network distance from each of the plurality of sending systems to each of the plurality of forwarding servers. The seventh aspect of the first forwarding server in the second example network may be implemented in combination with the first, second, third, fourth, fifth, and/or sixth aspect of the first forwarding server in the second example network, though the example embodiments are not limited in this respect.

In an eighth aspect of the first forwarding server in the second example network, the causation logic is configured to cause the current request to be forwarded to the second endpoint further based on, at least in part, a global network distance map, which includes a network distance from each sending system in a subset of the plurality of sending systems to each forwarding server in a subset of the plurality of forwarding servers, not indicating a network distance from the specified sending system to the first forwarding server. The eighth aspect of the first forwarding server in the second example network may be implemented in combination with the first, second, third, fourth, fifth, and/or sixth aspect of the first forwarding server in the second example network, though the example embodiments are not limited in this respect.

In a third example networked system that includes a plurality of forwarding servers that are communicatively coupled to a plurality of sending systems via a network, the plurality of forwarding servers include at least a first forwarding server and a second forwarding server. The first forwarding server comprises at least one element, an interface, determination logic, and causation logic. The at least one element comprises at least one of (a) one or more processors or (b) hardware logic/electrical circuitry. The interface is configured to receive a current request from a specified sending system of the plurality of sending systems via the network. The current request requests access to a computing software resource. The determination logic, implemented using the at least one element, is configured to determine whether the second forwarding server responds to one or more previous requests from the specified sending system. The one or more previous requests precede the current request. The causation logic, implemented using the at least one element, is configured to cause the current request to be forwarded to a second endpoint of a plurality of endpoints that is a second network distance from the second forwarding server rather than a first endpoint of the plurality of endpoints that is a first network distance from the second forwarding server based on, at least in part, a determination that the second forwarding server responds to the one or more previous requests from the specified sending system. The second endpoint is a third network distance from the first forwarding server. The first endpoint is a fourth network distance from the first forwarding server.

In a first aspect of the first forwarding server in the third example network, the interface is configured to receive a request indicator from the second forwarding server via the network. In accordance with the first aspect, the causation logic is configured to cause the current request to be forwarded to the second endpoint based on, at least in part, the request indicator indicating that the second forwarding server responds to the one or more previous requests from the specified sending system.

In a second aspect of the first forwarding server in the third example network, the first forwarding server further comprises notification logic configured to notify one or more third forwarding servers of the plurality of forwarding servers that a network distance between the second forwarding server and the specified sending system is less than a network distance between the first forwarding server and the specified sending system. The second aspect of the first forwarding server in the third example network may be implemented in combination with the first aspect of the first forwarding server in the third example network, though the example embodiments are not limited in this respect.

In a third aspect of the first forwarding server in the third example network, the current request and the one or more previous requests are included in a plurality of requests. In accordance with the third aspect, each of a plurality of affinity data indicates which of the plurality of forwarding servers responds to a respective request of the plurality of requests. In further accordance with the third aspect, a plurality of weights that are assigned to the plurality of respective affinity data decrease with respect to time. The third aspect of the first forwarding server in the third example network may be implemented in combination with the first and/or second aspect of the first forwarding server in the third example network, though the example embodiments are not limited in this respect.

In a fourth aspect of the first forwarding server in the third example network, the interface is configured to determine (e.g., infer) whether a network distance between the second forwarding server and the specified sending system is less than or equal to a network distance between each other forwarding server of the plurality of forwarding servers and the specified sending system. In accordance with the fourth aspect, the determination logic is further configured to determine whether an error occurs with regard to operation of the second forwarding server. In further accordance with the fourth aspect, the determination logic is configured to determine that the second forwarding server responds to the one or more previous requests from the specified sending system in response to a determination that the network distance between the second forwarding server and the specified sending system is less than or equal to the network distance between each other forwarding server of the plurality of forwarding servers and the specified sending system. In further accordance with the fourth aspect, the causation logic is configured to cause the current request to be forwarded to the second endpoint in response to a determination that the error occurs with regard to the operation of the second forwarding server. The fourth aspect of the first forwarding server in the third example network may be implemented in combination with the first, second, and/or third aspect of the first forwarding server in the third example network, though the example embodiments are not limited in this respect.

In a fifth aspect of the first forwarding server in the third example network, the current request is an anycast request. The fifth aspect of the first forwarding server in the third example network may be implemented in combination with the first, second, third, and/or fourth aspect of the first forwarding server in the third example network, though the example embodiments are not limited in this respect.

In a sixth aspect of the first forwarding server in the third example network, the causation logic is configured to cause the current request to be forwarded to the second endpoint in absence of a global network distance map, which indicates a network distance from each of the plurality of sending systems to each of the plurality of forwarding servers. The sixth aspect of the first forwarding server in the third example network may be implemented in combination with the first, second, third, fourth, and/or fifth aspect of the first forwarding server in the third example network, though the example embodiments are not limited in this respect.

In a seventh aspect of the first forwarding server in the third example network, the causation logic is configured to cause the current request to be forwarded to the second endpoint further based on, at least in part, a global network distance map, which includes a network distance from each sending system in a subset of the plurality of sending systems to each forwarding server in a subset of the plurality of forwarding servers, not indicating a network distance from the specified sending system to the first forwarding server. The seventh aspect of the first forwarding server in the third example network may be implemented in combination with the first, second, third, fourth, and/or fifth aspect of the first forwarding server in the third example network, though the example embodiments are not limited in this respect.

In an eighth aspect of the first forwarding server in the third example network, the second network distance is less than the first network distance. In accordance with the eighth aspect, the fourth network distance is less than the third network distance. The eighth aspect of the first forwarding server in the third example network may be implemented in combination with the first, second, third, fourth, fifth, and/or sixth or seventh aspect of the first forwarding server in the third example network, though the example embodiments are not limited in this respect In a first example method of forwarding a current request based on, at least in part, one or more previous requests in a networked system that includes a plurality of forwarding servers that are communicatively coupled to a plurality of sending systems via a network, the current request is received at a first forwarding server of the plurality of forwarding servers from a specified sending system of the plurality of sending systems via the network. The current request requests access to a computing software resource. A determination is made, using at least one processor of the first forwarding server, that a second forwarding server of the plurality of forwarding servers causes the one or more previous requests from the specified sending system to be forwarded to a specified endpoint. The one or more previous requests precede the current request. The current request is caused, using at least one processor of the first forwarding server, to be forwarded to the specified endpoint based on, at least in part, a determination that the second forwarding server causes the one or more previous requests to be forwarded to the specified endpoint.

In a first aspect of the first example method, the first example method further comprises receiving a request indicator at the first forwarding server from the second forwarding server via the network. The request indicator indicates that the second forwarding server causes the one or more previous requests to be forwarded to the specified endpoint. In accordance with the first aspect, determining that the second forwarding server causes the one or more previous requests to be forwarded to the specified endpoint comprises determining that the second forwarding server causes the one or more previous requests to be forwarded to the specified endpoint based on, at least in part, the request indicator indicating that the second forwarding server causes the one or more previous requests to be forwarded to the specified endpoint.

In a second aspect of the first example method, the first example method further comprises notifying one or more third forwarding servers of the plurality of forwarding servers, by the first forwarding server, that a second latency associated with a second communication path between the second forwarding server and the specified sending system is less than a first latency associated with a first communication path between the first forwarding server and the specified sending system. The second aspect of the first example method may be implemented in combination with the first aspect of the first example method, though the example embodiments are not limited in this respect.

In a third aspect of the first example method, the current request and the one or more previous requests are included in a plurality of requests. In accordance with the third aspect, each of a plurality of affinity data indicates which of the plurality of forwarding servers causes a respective request of the plurality of requests to be forwarded to an endpoint. In further accordance with the third aspect, a plurality of weights that are assigned to the plurality of respective affinity data decrease with respect to time. The third aspect of the first example method may be implemented in combination with the first and/or second aspect of the first example method, though the example embodiments are not limited in this respect.

In a fourth aspect of the first example method, the first example method further comprises receiving a latency indicator from the second forwarding server at the first forwarding server, the latency indicator indicating that a latency associated with a second communication path between the second forwarding server and the specified sending system is less than or equal to each of a plurality of latencies associated with other respective communication paths between other respective forwarding servers of the plurality of forwarding servers and the specified sending system. In accordance with the fourth aspect, the first example method further comprises determining that an error occurs with regard to operation of the second forwarding server. In further accordance with the fourth aspect, determining that the second forwarding server causes the one or more previous requests to be forwarded to the specified endpoint comprises determining that the second forwarding server causes the one or more previous requests to be forwarded to the specified endpoint in response to receiving the latency indicator. In further accordance with the fourth aspect, causing the current request to be forwarded comprises causing the current request to be forwarded to the specified endpoint in response to determining that the error occurs with regard to the operation of the second forwarding server. The fourth aspect of the first example method may be implemented in combination with the first, second, and/or third aspect of the first example method, though the example embodiments are not limited in this respect.

In a fifth aspect of the first example method, receiving the current request comprises receiving the current request at the first forwarding server in accordance with an anycast technique. The fifth aspect of the first example method may be implemented in combination with the first, second, third, and/or fourth aspect of the first example method, though the example embodiments are not limited in this respect.

In a sixth aspect of the first example method, causing the current request to be forwarded to the specified endpoint comprises causing the current request to be forwarded to the specified endpoint in absence of a global network distance map, which indicates a network distance from each of the plurality of sending systems to each of the plurality of forwarding servers. The sixth aspect of the first example method may be implemented in combination with the first, second, third, fourth, and/or fifth aspect of the first example method, though the example embodiments are not limited in this respect.

In a seventh aspect of the first example method, causing the current request to be forwarded to the specified endpoint comprises causing the current request to be forwarded to the specified endpoint further based on, at least in part, a global network distance map, which indicates a latency associated with a communication path between each sending system in a subset of the plurality of sending systems and each forwarding server in a subset of the plurality of forwarding servers, not indicating a latency associated with a communication path between the specified sending system and the first forwarding server. The seventh aspect of the first example method may be implemented in combination with the first, second, third, fourth, and/or fifth aspect of the first example method, though the example embodiments are not limited in this respect.

In a second example method of forwarding a current request based on, at least in part, one or more previous requests in a networked system that includes a plurality of forwarding servers that are communicatively coupled to a plurality of sending systems via a network, the current request for a computing software resource is received at a first forwarding server of the plurality of forwarding servers from a specified sending system of the plurality of sending systems via the network. The first forwarding server is associated with a first geographical region. A determination is made, using at least one processor of the first forwarding server, that the one or more previous requests that precede the current request are received at a second forwarding server of the plurality of forwarding servers from the specified sending system, the second forwarding server associated with a second geographical region. An inference is made, using at least one processor of the first forwarding server, that a location of the specified sending system is in the second geographical region based on, at least in part, a determination that the one or more previous requests are received at the second forwarding server. The current request is caused, using at least one processor of the first forwarding server, to be forwarded to a second endpoint that is associated with the second geographical region rather than a first endpoint that is associated with the first geographical region based on, at least in part, an inference that the location of the specified sending system is in the second geographical region.

In a first aspect of the second example method, causing the current request to be forwarded to the second endpoint comprises causing the current request to be forwarded to the second endpoint further based on, at least in part, a second version of the computing software resource that is available from the second endpoint being more relevant to the current request than a first version of the computing software resource that is available from the first endpoint.

In a second aspect of the second example method, the second example method further comprises receiving a request indicator at the first forwarding server from the second forwarding server via the network. The request indicator indicates that the second forwarding server receives the one or more previous requests from the specified sending system. In accordance with the second aspect, determining that the one or more previous requests are received at the second forwarding server comprises determining that the one or more previous requests are received at the second forwarding server based on, at least in part, the request indicator indicating that the second forwarding server receives the one or more previous requests from the specified sending system. The second aspect of the second example method may be implemented in combination with the first aspect of the second example method, though the example embodiments are not limited in this respect In a third aspect of the second example method, the second example method further comprises notifying one or more third forwarding servers of the plurality of forwarding servers, by the first forwarding server, that the location of the specified sending system is in the second geographical region. The third aspect of the second example method may be implemented in combination with the first and/or second aspect of the second example method, though the example embodiments are not limited in this respect.

In a fourth aspect of the second example method, the current request and the one or more previous requests are included in a plurality of requests. In accordance with the fourth aspect, each of a plurality of affinity data indicates which of the plurality of forwarding servers receives a respective request of the plurality of requests. In further accordance with the fourth aspect, a plurality of weights that are assigned to the plurality of respective affinity data decrease with respect to time. The fourth aspect of the second example method may be implemented in combination with the first, second, and/or third aspect of the second example method, though the example embodiments are not limited in this respect.

In a fifth aspect of the second example method, the second example method further comprises receiving a network distance indicator from the second forwarding server at the first forwarding server. The network distance indicator indicates that a network distance between the second forwarding server and the specified sending system is less than or equal to a network distance between each other forwarding server of the plurality of forwarding servers and the specified sending system. In accordance with the fifth aspect, the second example method further comprises determining that an error occurs with regard to operation of the second forwarding server. In further accordance with the second example method, determining that the one or more previous requests are received at the second forwarding server comprises determining that the one or more previous requests are received at the second forwarding server in response to receiving the network distance indicator. In further accordance with the fifth aspect, causing the current request to be forwarded comprises causing the current request to be forwarded to the second endpoint in response to determining that the error occurs with regard to the operation of the second forwarding server. The fifth aspect of the second example method may be implemented in combination with the first, second, third, and/or fourth aspect of the second example method, though the example embodiments are not limited in this respect.

In a sixth aspect of the second example method, receiving the current request comprises receiving the current request at the first forwarding server in accordance with an anycast technique. The sixth aspect of the second example method may be implemented in combination with the first, second, third, fourth, and/or fifth aspect of the second example method, though the example embodiments are not limited in this respect.

In a seventh aspect of the second example method, causing the current request to be forwarded to the second endpoint comprises causing the current request to be forwarded to the second endpoint in absence of a global network distance map, which indicates a network distance from each of the plurality of sending systems to each of the plurality of forwarding servers. The seventh aspect of the second example method may be implemented in combination with the first, second, third, fourth, fifth, and/or sixth aspect of the second example method, though the example embodiments are not limited in this respect.

In an eighth aspect of the second example method, causing the current request to be forwarded to the second endpoint comprises causing the current request to be forwarded to the second endpoint further based on, at least in part, a global network distance map, which includes a network distance from each sending system in a subset of the plurality of sending systems to each forwarding server in a subset of the plurality of forwarding servers, not indicating a network distance from the specified sending system to the first forwarding server. The eighth aspect of the second example method may be implemented in combination with the first, second, third, fourth, fifth, and/or sixth aspect of the second example method, though the example embodiments are not limited in this respect.

In a third example method of forwarding a current request based on, at least in part, one or more previous requests in a networked system that includes a plurality of forwarding servers that are communicatively coupled to a plurality of sending systems via a network, the current request is received at a first forwarding server of the plurality of forwarding servers from a specified sending system of the plurality of sending systems via the network. The current request requests access to a computing software resource. A determination is made, using at least one processor of the first forwarding server, that a second forwarding server of the plurality of forwarding servers responds to the one or more previous requests from the specified sending system. The one or more previous requests precede the current request. The current request is caused, using at least one processor of the first forwarding server, to be forwarded to a second endpoint of a plurality of endpoints that is a second network distance from the second forwarding server rather than a first endpoint of the plurality of endpoints that is a first network distance from the second forwarding server based on, at least in part, determining that the second forwarding server responds to the one or more previous requests from the specified sending system. The second endpoint is a third network distance from the first forwarding server. The first endpoint is a fourth network distance from the first forwarding server.

In a first aspect of the third example method, the third example method further comprises receiving a request indicator at the first forwarding server from the second forwarding server via the network. The request indicator indicates that the second forwarding server responds to the one or more previous requests from the specified sending system. In accordance with the first aspect, determining that the second forwarding server responds to the one or more previous requests from the specified sending system comprises determining that the second forwarding server responds to the one or more previous requests from the specified sending system based on, at least in part, the request indicator indicating that the second forwarding server responds to the one or more previous requests from the specified sending system.

In a second aspect of the third example method, the third example method further comprises notifying one or more third forwarding servers of the plurality of forwarding servers, by the first forwarding server, that a network distance between the second forwarding server and the specified sending system is less than a network distance between the first forwarding server and the specified sending system. The second aspect of the third example method may be implemented in combination with the first aspect of the third example method, though the example embodiments are not limited in this respect In a third aspect of the third example method, the current request and the one or more previous requests are included in a plurality of requests. In accordance with the third aspect, each of a plurality of affinity data indicates which of the plurality of forwarding servers responds to a respective request of the plurality of requests. In further accordance with the third aspect, a plurality of weights that are assigned to the plurality of respective affinity data decrease with respect to time. The third aspect of the third example method may be implemented in combination with the first and/or second aspect of the third example method, though the example embodiments are not limited in this respect.

In a fourth aspect of the third example method, the third example method further comprises determining (e.g., inferring) whether a network distance between the second forwarding server and the specified sending system is less than or equal to a network distance between each other forwarding server of the plurality of forwarding servers and the specified sending system. In accordance with the fourth aspect, the third example method further comprises determining that an error occurs with regard to operation of the second forwarding server. In accordance with the fourth aspect, determining that the second forwarding server responds to the one or more previous requests from the specified sending system comprises determining that the second forwarding server responds to the one or more previous requests from the specified sending system in response to determining that the network distance between the second forwarding server and the specified sending system is less than or equal to the network distance between each other forwarding server of the plurality of forwarding servers and the specified sending system. In further accordance with the fourth aspect, causing the current request to be forwarded comprises causing the current request to be forwarded to the second endpoint in response to determining that the error occurs with regard to the operation of the second forwarding server. The fourth aspect of the third example method may be implemented in combination with the first, second, and/or third aspect of the third example method, though the example embodiments are not limited in this respect.

In a fifth aspect of the third example method, receiving the current request comprises receiving the current request at the first forwarding server in accordance with an anycast technique. The fifth aspect of the third example method may be implemented in combination with the first, second, third, and/or fourth aspect of the third example method, though the example embodiments are not limited in this respect.

In a sixth aspect of the third example method, causing the current request to be forwarded to the second endpoint comprises causing the current request to be forwarded to the second endpoint in absence of a global network distance map, which indicates a network distance from each of the plurality of sending systems to each of the plurality of forwarding servers. The sixth aspect of the third example method may be implemented in combination with the first, second, third, fourth, and/or fifth aspect of the third example method, though the example embodiments are not limited in this respect.

In a seventh aspect of the third example method, causing the current request to be forwarded to the second endpoint comprises causing the current request to be forwarded to the second endpoint further based on, at least in part, a global network distance map, which includes a network distance from each sending system in a subset of the plurality of sending systems to each forwarding server in a subset of the plurality of forwarding servers, not indicating a network distance from the specified sending system to the first forwarding server. The seventh aspect of the third example method may be implemented in combination with the first, second, third, fourth, and/or fifth aspect of the third example method, though the example embodiments are not limited in this respect.

In an eighth aspect of the third example method, the second network distance is less than the first network distance. In accordance with the eighth aspect, the fourth network distance is less than the third network distance. The eighth aspect of the third example method may be implemented in combination with the first, second, third, fourth, fifth, and/or sixth or seventh aspect of the third example method, though the example embodiments are not limited in this respect.

A first example computer program product includes a computer-readable medium having computer program logic recorded thereon for enabling a processor-based system to forward a current request based on, at least in part, one or more previous requests in a networked system that includes a plurality of forwarding servers that are communicatively coupled to a plurality of sending systems via a network. The computer program product includes a first program logic module and a second program logic module. The first program logic module is for enabling the processor-based system to determine that a second forwarding server of the plurality of forwarding servers causes the one or more previous requests from a specified sending system of the plurality of sending systems to be forwarded to a specified endpoint. The one or more previous requests precede a current request that is received from the specified sending system via the network. The current request requests access to a computing software resource. The second program logic module is for enabling the processor-based system to cause the current request to be forwarded to the specified endpoint based on, at least in part, a determination that the second forwarding server causes the one or more previous requests to be forwarded to the specified endpoint.

A second example computer program product includes a computer-readable medium having computer program logic recorded thereon for enabling a processor-based system to forward a current request based on, at least in part, one or more previous requests in a networked system that includes a plurality of forwarding servers that are communicatively coupled to a plurality of sending systems via a network. The computer program product includes a first program logic module, a second program logic module, and a third program logic module. The first program logic module is for enabling the processor-based system to determine that the one or more previous requests that precede a current request for a computing software resource are received at a second forwarding server of the plurality of forwarding servers from a specified sending system of the plurality of sending systems. The current request is received at a first forwarding server of the plurality of forwarding servers from the specified sending system via the network. The first forwarding server is associated with a first geographical region. The second forwarding server is associated with a second geographical region. The second program logic module is for enabling the processor-based system to infer that a location of the specified sending system is in the second geographical region based on, at least in part, a determination that the one or more previous requests are received at the second forwarding server. The third program logic module is for enabling the processor-based system to cause the current request to be forwarded to a second endpoint that is associated with the second geographical region rather than a first endpoint that is associated with the first geographical region based on, at least in part, an inference that the location of the specified sending system is in the second geographical region.

A third example computer program product includes a computer-readable medium having computer program logic recorded thereon for enabling a processor-based system to forward a current request based on, at least in part, one or more previous requests in a networked system that includes a plurality of forwarding servers that are communicatively coupled to a plurality of sending systems via a network. The computer program product includes a first program logic module and a second program logic module. The first program logic module is for enabling the processor-based system to determine that a second forwarding server of the plurality of forwarding servers responds to the one or more previous requests from a specified sending system of the plurality of sending systems. The one or more previous requests precede a current request that is received at a first forwarding server of the plurality of forwarding servers from the specified sending system via the network. The current request requests access to a computing software resource. The second program logic module is for enabling the processor-based system to cause the current request to be forwarded to a second endpoint of a plurality of endpoints that is a second network distance from the second forwarding server rather than a first endpoint of the plurality of endpoints that is a first network distance from the second forwarding server based on, at least in part, determining that the second forwarding server responds to the one or more previous requests from the specified sending system. The second endpoint is a third network distance from the first forwarding server. The first endpoint is a fourth network distance from the first forwarding server.

IV. Example Computer System

Figure 7:
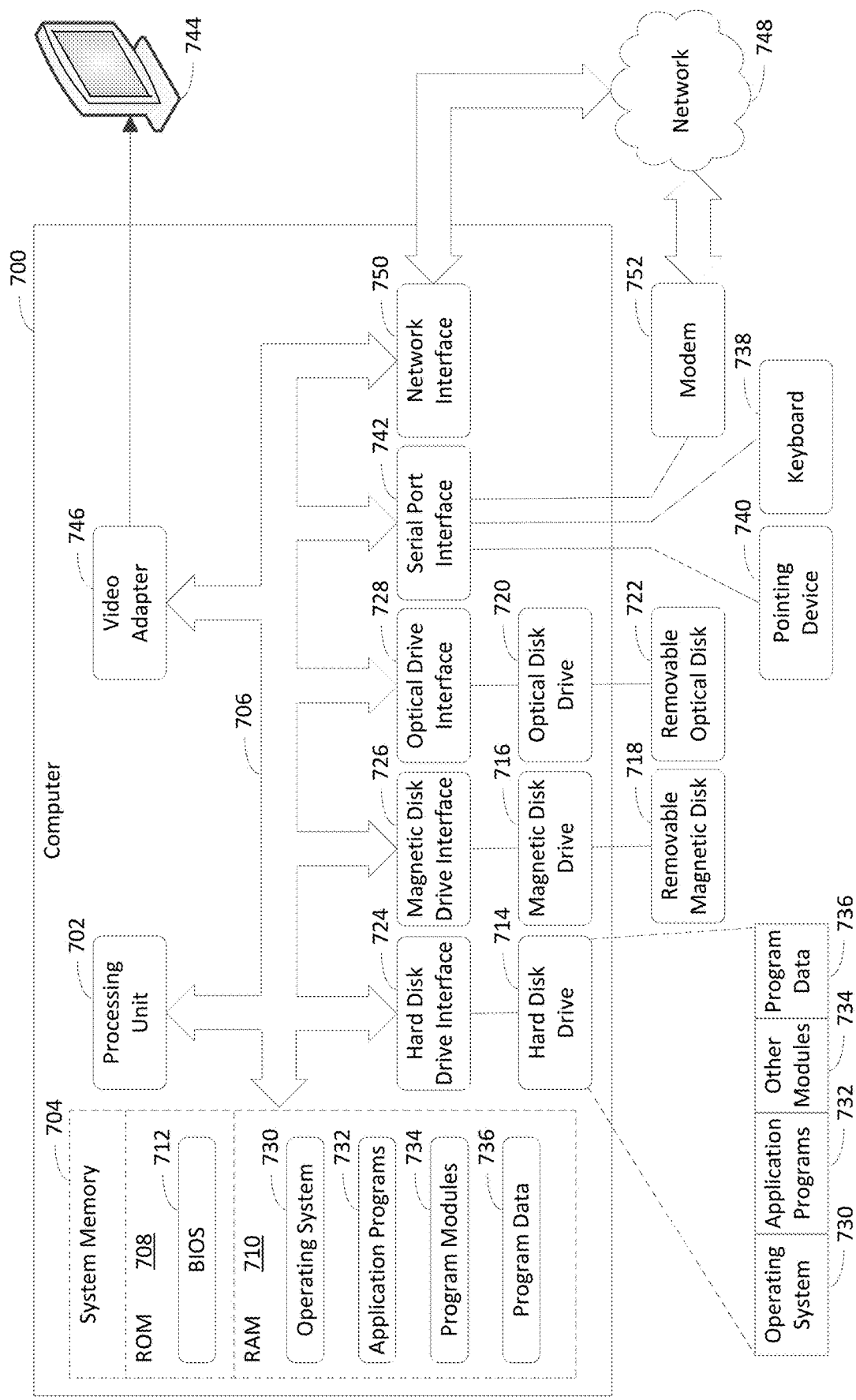
FIG. 7 depicts an example computer in which embodiments may be implemented.

FIG. 7 depicts an example computer 700 in which embodiments may be implemented. Any one or more of client devices 102A-102M, any one or more of intermediate servers 104A-104M, any one or more of forwarding servers 106A-106N, and/or any one or more of endpoints 108A-108P shown in FIG. 1; first forwarding server 400 shown in FIG. 4; and/or first forwarding server 600 shown in FIG. 6 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

It will be recognized that computer 700 need not necessarily include any of the drives mentioned above. For instance, computer 700 may include a virtual hard disk, a solid-state drive (SSD), and/or other type of technology in addition to or in lieu of any one or more of the drives mentioned above.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of request-based forwarding logic 112, determination logic 404, causation logic 406, notification logic 408, determination logic 604, causation logic 606, notification logic 608, inference logic 610, flowchart 200 (including any step of flowchart 200), flowchart 300 (including any step of flowchart 300), and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Computer 700 need not necessarily include all of the elements shown in FIG. 7. It will be recognized that computer 700 may not include any one or more of the elements.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. In a networked system including a plurality of forwarding servers communicatively coupled to a plurality of sending systems via a network, the plurality of forwarding servers including at least a first forwarding server and a second forwarding server, the first forwarding server comprising:
one or more processors;
memory in electronic communication with the one or more processors; and
instructions stored in the memory, the instructions being executable by the one or more processors to cause the first forwarding server to:
receive, from the second forwarding server, an indication that one or more previous requests for a computing software resource from a specified sending system of the plurality of sending systems have been received by the second forwarding server associated with a second geographical region;
receive a current request for the computing software resource from the specified sending system of the plurality of sending systems via the network, the first forwarding server associated with a first geographical region;

based on the received indication that the one or more previous requests have been received from the specified sending system by the second forwarding server prior to receiving the current request from the specified sending system infer that a location of the specified sending system is in the second geographical region based on receiving the indication that the one or more previous requests have been received at the second forwarding server; and
cause the current request to be forwarded to a second endpoint associated with the second geographical region rather than a first endpoint associated with the first geographical region based on inferring that the location of the specified sending system is in the second geographical region.

2. The first forwarding server of claim 1, wherein causing the current request to be forwarded to the second endpoint is further based on a determination that a second version of the computing software resource available from the second endpoint is more relevant to the current request than a first version of the computing software resource available from the first endpoint.

3. The first forwarding server of claim 1, further comprising instructions being executable by the one or more processors to cause the first forwarding server to notify a third forwarding server of the plurality of forwarding servers that the location of the specified sending system is in the second geographical region.

4. The first forwarding server of claim 1, wherein:
the current request and the one or more previous requests are included in a plurality of requests, and further comprising instructions being executable by the one or more processors to cause the first forwarding server to:
identify a plurality of affinity data associated with the plurality of requests indicating, for each request of the plurality of requests, which of the plurality of forwarding servers receives a respective request of the plurality of requests; and
identify a plurality of weights respectively assigned to the plurality of affinity data, wherein the plurality of weights decreases over time,
wherein causing the current request to be forwarded to the second endpoint is further based on the plurality of affinity data and corresponding plurality of weights assigned to the plurality of affinity data.

5. The first forwarding server of claim 1, further comprising instructions being executable by the one or more processors to cause the first forwarding server to:
receive a network distance indicator from the second forwarding server, the network distance indicator indicating that a network distance between the second forwarding server and the specified sending system is less than or equal to a network distance between each of other forwarding servers of the plurality of forwarding servers and the specified sending system; and
determine whether an error occurs in an operation of the second forwarding server and to determine that the one or more previous requests are received at the second forwarding server in response to receiving the network distance indicator;
wherein causing the current request to be forwarded to the second endpoint is further based on determining that the error occurred in the operation of the second forwarding server.

6. The first forwarding server of claim 1, wherein the current request is an anycast request.

7. The first forwarding server of claim 1, wherein causing the current request to be forwarded to the second endpoint is further based on an absence of a global network distance map accessible to the first forwarding server, the global network distance map indicating a network distance from each of the plurality of sending systems to each of the plurality of forwarding servers.

8. The first forwarding server of claim 1, wherein causing the current request to be forwarded to the second endpoint is further based on a global network distance map, the global network distance map including network distance information indicating a network distance from each sending system in a subset of the plurality of sending systems to each forwarding server in a subset of the plurality of forwarding servers, wherein the network distance information does not include an indication of a network distance from the specified sending system to the first forwarding server.

9. A method performed by a first forwarding server of a plurality of forwarding servers communicatively coupled to a plurality of sending systems via a network, the first forwarding server being associated with a first geographical region, the method comprising:
receiving, from a second forwarding server associated with a second geographical location, an indication that one or more previous requests for a computing software resource from a specified sending system of the plurality of sending systems have been received by the second forwarding server associated with the second geographical region;
receiving, at the first forwarding server associated with the first geographical location, a current request for a resource from the specified sending system of the plurality of sending systems via the network;
based on the received indication that the one or more previous requests have been received from the specified sending system by the second forwarding server prior to receiving the current request from the specified sending system, cause the current request to be forwarded to a second endpoint associated with the second geographical region rather than to a first endpoint associated with the first geographical region based on an inference that the specified sending system is located in the second geographical region, the inference being based on the received indication that the one or more previous requests have been received by the second forwarding server.

10. The method of claim 9, further comprising inferring that the specified sending system is located in the second geographical region based on the received indication that the one or more previous requests have been received at the second forwarding server.

11. The method of claim 9, wherein causing the current request to be forwarded to the second endpoint is further based on a determination that a second version of the resource available from the second endpoint is more relevant to the first request than a first version of the resource available from the first endpoint.

12. The method of claim 9, further comprising notifying a third forwarding server of the plurality of forwarding servers that the specified sending system is located in the second geographical region.

13. The method of claim 9 wherein:
the current request and the one or more previous requests are included in a plurality of requests, the method further comprising:
identifying a plurality of affinity data associated with the plurality of requests indicating, for each request of the plurality of requests, which of the plurality of forwarding servers receives a respective request of the plurality of requests; and
identifying a plurality of weights respectively assigned to the plurality of affinity data, wherein the plurality of weights decreases time,
wherein causing the current request to be forwarded to the second endpoint is further based on the plurality of affinity data and corresponding plurality of weights assigned to the plurality of affinity data.

14. The method of claim 9, further comprising receiving a network distance indicator from the second forwarding server, the network distance indicator indicating that a network distance between the second forwarding server and the specified sending system is less than or equal to a network distance between each of the other forwarding servers of the plurality of forwarding servers and the specified sending system.

15. The method of claim 14, further comprising:
determining whether an error occurs in an operation of the second forwarding server and to determine that the one or more previous requests are received at the second forwarding server in response to receiving the network distance indicator,
wherein causing the current request to be forwarded to the second endpoint is further based on determining that the error occurred in the operation of the second forwarding server.

16. The method of claim 14, wherein a network distance between two entities is an amount of one or more of latency and cost associated with a communication between the two entities.

17. The method of claim 14, wherein a network distance between two entities is a geographical distance between the two entities.

18. The method of claim 9, wherein causing the current request to be forwarded to the second endpoint is further based on an absence of a global network distance map accessible to the first forwarding server, the global network distance map indicating a network distance from each of the plurality of sending systems to each of the plurality of forwarding servers.

19. The method of claim 9, wherein causing the current request to be forwarded to the second endpoint is further based on a global network distance map, the global network distance map including network distance information indicating a network distance from each sending system in a subset of the plurality of sending systems to each forwarding server in a subset of the plurality of forwarding servers, wherein the network distance information does not include an indication of a network distance from the specified sending system to the first forwarding server.

* * * * *